US007774219B1

(12) United States Patent
Meredith et al.

(10) Patent No.: US 7,774,219 B1
(45) Date of Patent: Aug. 10, 2010

(54) LONG RUNNING TRANSACTION INTEGRATION WITH SELECTIVE DEHYDRATION AND SELECTIVE COMPENSATION

(75) Inventors: Gregory Lucius Meredith, Seattle, WA (US); Amit Mital, Kirkland, WA (US); Anthony Andrews, Redmond, WA (US); Arunchallam S. Sivakumar, Issaquah, WA (US); Donald J. McCrady, Redmond, WA (US); Patrick J. Helland, Bellevue, WA (US); Bimal Mehta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1185 days.

(21) Appl. No.: 09/620,771

(22) Filed: Jul. 21, 2000

Related U.S. Application Data

(60) Provisional application No. 60/200,438, filed on Apr. 28, 2000.

(51) Int. Cl.
   *G06F 9/44* (2006.01)
(52) U.S. Cl. .......................................................... 705/7
(58) Field of Classification Search ................ 705/8, 705/7
   See application file for complete search history.

(56) References Cited

U.S. PATENT DOCUMENTS

| 5,261,069 | A |   | 11/1993 | Wilkinson et al. |        |
|-----------|---|---|---------|------------------|--------|
| 5,524,241 | A | * | 6/1996  | Ghoneimy et al.  | 707/10 |
| 5,548,506 | A | * | 8/1996  | Srinivasan       | 705/8  |
| 5,576,946 | A |   | 11/1996 | Bender           |        |
| 5,581,691 | A | * | 12/1996 | Hsu et al.       | 714/15 |
| 5,630,069 | A | * | 5/1997  | Flores et al.    | 705/7  |
| 5,692,125 | A | * | 11/1997 | Schloss et al.   | 705/9  |
| 5,706,429 | A | * | 1/1998  | Lai et al.       | 709/230|
| 5,734,837 | A |   | 3/1998  | Flores           |        |
| 5,745,901 | A |   | 4/1998  | Entner           |        |
| 5,774,661 | A |   | 6/1998  | Catterjee        |        |
| 5,835,898 | A |   | 11/1998 | Borg             |        |

(Continued)

FOREIGN PATENT DOCUMENTS

DE      EP0554854 A2 * 3/1993

OTHER PUBLICATIONS

Microsoft BizTalk Server2000—Enterprise Edition—Getting Started with Microsoft BizTalk Server 2000 Microsoft, 1999-2000.*

(Continued)

*Primary Examiner*—Scott L Jarrett
(74) *Attorney, Agent, or Firm*—Workman Nydegger

(57) ABSTRACT

A method for executing a schedule in a workflow application is provided. The method includes selectively storing a schedule state to a storage medium based on a latency attribute associated with the schedule. Also provided is a method of executing a workflow application comprising long running transactions. This method includes selectively storing a schedule state to a storage medium based on a latency attribute associated with the schedule, and selectively compensating certain actions within the schedule according to a compensation parameter associated with an action, based on failure or abortion of another action within the schedule. In addition, there is provided a method of executing a schedule comprising selectively compensating certain actions or transactions within the schedule according to a compensation parameter associated with an action or transaction, based on failure or abortion of another action or transaction within the schedule.

14 Claims, 27 Drawing Sheets

U.S. PATENT DOCUMENTS

| | | | |
|---|---|---|---|
| 5,870,545 A * | 2/1999 | Davis et al. | 709/201 |
| 5,893,905 A * | 4/1999 | Main et al. | 705/11 |
| 5,918,218 A | 6/1999 | Harris et al. | |
| 5,930,510 A * | 7/1999 | Beylin et al. | 717/161 |
| 5,930,512 A | 7/1999 | Boden | |
| 5,940,839 A | 8/1999 | Chen et al. | |
| 5,960,420 A | 9/1999 | Leymann et al. | |
| 5,961,585 A * | 10/1999 | Hamlin | 709/108 |
| 5,999,910 A * | 12/1999 | Rosenfeld et al. | 705/7 |
| 5,999,911 A | 12/1999 | Berg | |
| 6,009,405 A | 12/1999 | Leymann et al. | |
| 6,038,638 A * | 3/2000 | Cadden et al. | 711/111 |
| 6,041,306 A * | 3/2000 | Du et al. | 705/8 |
| 6,073,109 A | 6/2000 | Flores | |
| 6,101,481 A * | 8/2000 | Miller | 705/9 |
| 6,225,998 B1 | 5/2001 | Okita | |
| 6,233,537 B1 | 5/2001 | Gryphon | |
| 6,262,729 B1 | 7/2001 | Marcos | |
| 6,275,863 B1 * | 8/2001 | Leff et al. | 709/248 |
| 6,516,322 B1 | 2/2003 | Meredith | |
| 6,519,568 B1 * | 2/2003 | Harvey et al. | 705/1 |
| 6,519,763 B1 * | 2/2003 | Kaufer et al. | 717/101 |
| 6,525,413 B1 | 2/2003 | Cloud et al. | |
| 6,606,740 B1 | 8/2003 | Lynn | |
| 6,625,602 B1 * | 9/2003 | Meredith et al. | 707/8 |
| 6,725,428 B1 | 4/2004 | Pareschi | |
| 6,889,196 B1 * | 5/2005 | Clark | 705/9 |
| 6,901,405 B1 * | 5/2005 | McCrady et al. | 707/102 |
| 6,918,053 B1 * | 7/2005 | Thatte et al. | 714/16 |
| 6,968,360 B1 * | 11/2005 | Morrow et al. | 709/206 |
| 6,968,503 B1 | 11/2005 | Chang et al. | |
| 7,184,967 B1 | 2/2007 | Mital | |
| 2001/0044738 A1 | 11/2001 | Elkin | |
| 2002/0019797 A1 | 2/2002 | Stewart et al. | |
| 2002/0035584 A1 | 3/2002 | Scheier | |
| 2004/0078373 A1 | 4/2004 | Ghoneimy | |

OTHER PUBLICATIONS

Microsoft Announces availability of BizTalk Server 2000 beta M2 Presswire, Aug. 15, 2000.*
Microsoft debuts BizTalk Server 2000 Technology M2 Presswire, Apr. 12, 2000.*
BizTalk Initiative for Automating Business Process Integration—White Paper Microsoft, Mar. 15, 2000.*
BizTalk Orchestration—A Technology for Orchestrating Business Interactions—White Paper Microsoft, Jun. 5, 2000.*
Liu, Ling et al., A Transaction Activity Model for Organizing Open-ended Cooperative Activities IEEE, 1998.*
Pu, Calton et al., Split Transactions for Open-Ended Activities Proceedings of the 14$^{th}$ VLDB Conference, 1988.*
Ladin, Rivka, A Transactional Model for Long-Running Activities Digital Equipment Corporation, Cambridge Research Lab, Mar. 1, 1991.*
"Workflow Management Coalition Workflow Standard—Interoperability Wf-XML Binding" (Jan. 11, 2000) Workflow Management Coalition, Doc. No. WFMC-TC-1023, 40 pages.
37 XML based Process Management Standard Launched by Workflow Management Coalition-'Wf-XML', (Jul. 7, 1999) httP:// www.wfmc.org/pr/pr1999-07-07.pdf> last accessed Jan. 3, 2006, 4 pages.
Gillmor, Steve, Talking About BizTalk, XML & Webservices Magazine, Fall 2000, Retrieved Dec. 15, 2004 from: www.fawcette.com/archi ves/premier/mgznarch/xml/2 000 /04 fal 00 / sg0004 .asp.
McKendrick, Steve, Microsoft Orchestrates Visual View of Biz Talk-Product Development ENT, Jun. 28, 2000.*
Microsoft Advances BizTalk Vision with Release of BizTalk Jumpstart Toolkit Version 2.0 PR Newswire, Feb. 14, 2000.
Gordon, Phillip, A piece of the big picture for Microsoft InformationWeek, Nov. 1, 1999, p. 80.
Mohr, Stephen, Introduction to Microsoft BizTalk Server Wrox Conferences, Las Vegas, Sep. 2000.
Mohan, C., Recent Trends in Workflow Management Products, Standards and Research IBM Almaden Research Center, 1997.
Shan, Ming-Chien et al., HP Workflow Research: Past, Present and Future Software Technology Laboratory, Aug. 1997.
A Common Object Model Discussion Paper The Workflow Management Coalition, Jan. 1998.
Workflow and Internet: Catalysts for Radical Change A WFMC White Paper The Workfow Management Coalition, Jun. 1998.
Dunn, Julie, Solutions Overview InfoWorld, Jan. 6, 1997, vol. 19, No. 1, pp. 56, 58, 60.
Burden, Kevin, Taking the "techie" out of workflow design ComputerWorld, Sep. 15, 1997, vol. 31, No. 37. p. 94.
Cox, Nancy, Passing the Baton With Four-Enterprise-Ready Workflow Management Product Network Computing, Oct. 15, 1997, vol. 8, No. 19, pp. 130-136.
Angus, Jeff, Workflow system addresses middle ground InformationWeek, Dec. 15, 1997, pp. 118-119.
Paul, Santanu et al., RainMan: A Workflow System for the Internet OOPS LA, 1997, Atlanta, USA.
Kiely, Don, Microsoft Tackles the Workflow Beast Information Week, Nov. 15, 1999, pp. 203-204, 206.
Sprott, David, Technology Audit I-Flow Butler Direct Limited, Jun. 1999.
Mohan, c., Workflow Management in the Internet Age May 1999.
Allison, Steve, Plexus FloWare: World Class Workflow BancTec, 2000.
Zeng, Liangzhao et al., On Demand Business-to-Business Integration 9th International Conf. on Cooperative Info. Sys., vol. 2172, 2001.
Forte Conductor Web Pages Forte, Jan. 1998, Retrieved from Archive.org Feb. 9, 2006.
Teev.com Web Pages Teev, Feb. 2001, Retrieved from Archive.org Feb. 9, 2006.
Teamware Flow 3.1 User's Guide Teamware, Apr. 2000.*
ActionWorkflow Enterprise Series 3.0 Process Builder User's Guide Action Technologies, Inc., 1996.
Ott, Marcus, Conceptual Design and Implementation of a Graphical Workflow-Modeling Editor in the Context of Distributed Groupware-Databases, Master Thesis, University of Paderborn, May 1994.
Using the WFT Development Environment Template Software 1998, Chapters 2, 3 and 6.
Visio and Partners Announce Business Process Management Coalition PR Newswire, Apr. 29, 1996.
Computron Software: Computron's workflow software wins Product of the Year Award Business Wire, Jan. 9, 1996.
Schumacher, Robin, Visio Professional 4.5 DBMS, Oct. 1997, vol. 10, No. 11.
Verve Introduces New Process Editor Tool; Graphical Workflow Tool Will Include Full Source Code Business Wire, Jun. 14, 1999.
Bekker, Scott, Microsoft Rolls out a Workflow Toolset ENT, Oct. 20, 1999.
Doherty, Robert, Visio Reshapes Company Thinking Information Week, Nov. 1, 1999, pp. 77, 80, 82.
Lennox, Michael, Draw smart with Visio 2000 Technical Edition CADalyst, Dec. 1999, vol. 16, No. 12, pp. 46-49.
Burnett et al., Visual Object Programming Concepts and Environments Manning Publishing Co., 1995, ISBN: 1-884777-01-5.
Koulopoulus, Thomas, The Workflow Imperative John Wiley & Sons, Inc., 1995, ISBN: 0-471-28685-0.
Bekker, Scott, Microsoft Rolls Out a Workflow Toolset-Grizzly Workflow-design software ENT, Oct. 20, 1999.
Onoda, Sen'ichi et al., Definition of Deadlock Patterns for Business Process Workflow Models Proceedings of32nd Hawaii International Conf. On System Sciences, 1999.
Verbeek, H.M.W. et al., Diagnosing Workflow Processes using Woflan 1999, Eidhoven University of Technology: Eidhoven.
Wang, W. et al., E-process design and assurance using model checking Computer, vol. 33, No. 10, Oct. 2000, pp. 48-53.
Kararnanolis et al., Model Checking for Workflow Schemas EDOC' 00, 2000, pp. 170-179.

* cited by examiner

LONG RUNNING TRANSACTION INTEGRATION WITH SELECTIVE DEHYDRATION AND SELECTIVE COMPENSATION

CROSS-REFERENCE TO RELATED APPLICATION

This application claims priority to U.S. Provisional Patent Application No. 60/200,438 filed on Apr. 28, 2000, entitled LONG RUNNING TRANSACTION INTEGRATION WITH SELECTIVE DEHYDRATION AND SELECTIVE COMPENSATION.

TECHNICAL FIELD

The present invention relates to transaction processing in computer systems. More particularly, the invention relates to processing long running transactions in computer systems and further to dehydration and rehydration in such transaction processing.

BACKGROUND OF THE INVENTION

Workflow applications are related to businesses, governments, and other organizations where information and work product flows between various persons or departments. Workflow generally is the flow of information and control in such organizations. In a business setting, these processes include sales and order processing, purchasing tasks, inventory control and management, manufacturing and production control, shipping and receiving, accounts payable, and the like. Businesses continually strive to define, document, and streamline such processes in order to effectively compete.

Computer systems and associated software now provide tools with which businesses and other organizations can improve their workflow. Software tools can be used to model business workflow processes or applications and identify inefficiencies and possible improvements. In addition, where a process involves exchanging data between people, departments, plants, or even between separate companies, computer systems and networks can be used to implement such exchanges. Such systems and software tools are further able to implement large-scale computations and other data or information processing which are typically associated with business related information. Automation of such information processing has led to many efficiency improvements in the modern business world; and workflow management includes the effective management of information flow and control in an organization's business processes. Automation of workflow management is now allowing businesses and other organizations to further improve performance by executing workflow transactions in computer systems, including global computer networks, such as the Internet.

Many applications for workflow tools are internal to a business or organization. With the advent of networked computers having modems or other type communications links, computer systems at remote locations can now communicate easily with one another. Such enhanced communication allows computer system workflow applications to be used between remote facilities within a company. An example would include forwarding a customer order from a corporate headquarters to a remote field sales office for verification by the appropriate sales person, and returning a verification to the headquarters. Workflow applications also can be of particular utility in processing business transactions between different companies. In a typical application, two companies having a buyer-seller relationship may desire to automate the generation and processing of purchase orders, product shipments, billing, and collections. Automating such processes can result in significant efficiency improvements which are not otherwise possible. However, this inter-company application of workflow technology requires co-operation of the companies and proper interfacing of the individual company's existing computer systems.

Thus far, workflow application tools have been developed which provide some capability for automating business workflow by defining workflow applications. Many business transactions are of a short duration. For example, a buyer may wish to transmit a purchase order number along with a list of products being purchased to a seller, and the seller may wish to respond with a confirmation of the order and an expected shipment date. This type of transaction may involve a general consumer purchasing products from a retailer, or alternatively two large corporate entities which do business regularly. The data associated with the order and the confirmation may be relatively small and the transmission time for the data may be on the order of fractions of a second. A workflow application running in a computer system may allocate system resources to the transaction during its pendency, which is generally very short—i.e. has a small latency. In this scenario, the system would use a conventional database transaction, i.e. an ACID transaction. An ACID transaction locks database information for the duration of the transaction. However, there are other types of business workflow transactions which have significantly longer durations and which may occupy system resources for an unacceptably long time. Such transactions often are called long running transactions.

Examples of long running transactions may include manufacturing or production control systems wherein a product is manufactured according to a particular workflow. It is common for a product to be manufactured in separate subassemblies, possibly at remote facilities. In such a situation, the time between production initiation and completion may be days, weeks, or months. A workflow application which tracks or manages the progress of such a workflow may be resident in a computer system for a very long time. Moreover, such an application may wait for several weeks for the product to reach a certain intermediate assembly stage, perform some bookkeeping function which lasts for a few seconds, and then remain waiting again for several days for the next stage of production. Such long running transactions may occupy system resources for unacceptably long periods of time, while performing a relatively small amount of work. Consequently, there remains a need for workflow applications tools which can execute long running transactions in a computer system, while utilizing system resources judiciously.

System resources in this regard, may include allocated space in memory for executable code and associated data, as well as permissive access to databases. In order to maintain database coherency, access to certain elements of a database may be exclusively allocated to a specific instance of a workflow transaction until the transaction completes, (e.g. aborts or commits). Access to these database elements is denied to other transactions or objects while the transaction of interest is active. In other words, the data is locked. Once a running transaction completes, or commits, the data is unlocked, (e.g. becomes available for access by other transactions or programs). Alternatively, if the transaction fails or aborts, a transaction log is consulted and any data manipulations performed by the aborted transaction are undone, (e.g. rolled back).

For long running transactions, data locking may be undesirable, since other transactions may be prevented from running due to the unavailability of database access. As an example, accounting transactions may be prevented from accessing an inventory database to query the inventory of a product subassembly because a long running production control transaction has exclusive access to this data while tracking or managing production of certain units of manufacture which include the subassembly. Locking database resources for significant durations reduces system scalability.

SUMMARY OF THE INVENTION

Long running transactions are supported by a run-time engine featuring user defined transaction boundaries and associated semantics, selective dehydration and rehydration, and selective compensation of certain actions based on the transaction boundaries. Long running transactions are implemented by synthesizing logical transactions out of multiple atomic transactions. While long running transactions may be run without selective dehydration and rehydration, in most scenarios significant advantages are achieved through dehydration and rehydration in combination with user defined transaction boundaries and selective compensation.

The invention includes a method of executing long running transactions in a computer system, as well as a computer-readable medium having computer-executable instructions for performing the steps of the inventive method. The method includes recognizing user defined transaction boundaries within a schedule, selectively dehydrating a schedule based on latency attributes, and selectively compensating particular committed actions based on failure or abortion of another action according to the user defined transaction boundaries and compensation parameters. As used herein, the term schedule means an application, which may comprise, for example, a workflow application.

The transaction boundaries are defined logically by a programmer using, for example, a workflow definition language or in graphical form using a graphical user interface. Based on the structure of the resulting schedule, the run-time engine determines the transaction boundaries and semantics associated therewith.

The present invention further includes selective compensation by performing predefined compensation routines associated with committed actions or transactions based on their relationship with an aborted action or transaction. In this regard, the dependency between aborted, incomplete, and committed actions within a transaction is determined at run-time by interpretation of the transaction boundary structure as defined by the schedule. The invention therefore accomplishes compensation based on the user defined transaction structure and compensation parameters.

The present invention further relates to the dehydration of a schedule state. Dehydration is a process or method whereby system resource utilization may be optimized to support long running transactions. The invention includes persisting a schedule state to a disk or other storage medium when the expected latency of an action or transaction within the schedule exceeds a user-defined or other type computer system latency threshold. The storage medium may be, for example, a database, and the schedule state may be stored therein according to a database schema. In addition, the invention includes a computer-readable medium having computer-executable instructions for performing the method of the invention.

According to one aspect of the invention, a method includes providing a latency attribute for one or more actions and/or transactions within the schedule. The state of the schedule, and/or data associated with the actions or transactions is persisted (e.g., saved) in a storage medium based on a comparison of a latency attribute associated with an action or transaction with the computer system latency threshold.

In addition, the persisted state information and/or data may be associated (e.g., proxied) with an action (e.g., a message) following the dehydration point in the schedule. Such a method is referred to as dehydration, and allows the computer system to use the latency characteristics of actions or transactions to determine when and if a schedule state is to be persisted. The dehydration feature thus allows sink actions with long expected latency to cause the application process to be persisted (e.g., in a database) while the system resources are used to perform other tasks. In this manner, system utilization and overall performance are increased for long running transactions where, for example, latency can be longer than a few seconds. In addition, the application process becomes fault tolerant—it can survive failure of the computer system since the process data is stored in a reliable store.

Upon system receipt of data such as a message or external stimuli associated with the long running transaction, the schedule state information and/or data associated with an action or transaction is de-persisted from the storage medium into the computer system memory by a process of rehydration. Rehydration may include re-establishing the schedule execution location, re-initializing relevant data, re-instantiating live objects, and continuing the execution of the schedule from the dehydration point.

Actions may be annotated with latency attributes by a user, based on an estimated or expected latency of the actions. In this regard, for example, a user may know in advance that a particular port takes approximately 30 seconds to respond with data needed for a particular action within the schedule, and can set the latency attribute of the action to 30. Alternatively, the latency attributes of individual actions or transactions may be initially estimated, and updated over time based on actual latencies or durations or other variables. Upon execution of an action, the latency attribute associated with the action will be compared with the system latency threshold, and the schedule may be persisted at the point of the action based, either wholly or in part, on the results of the comparison.

In accordance with the present invention, long running transactions are supported by run-time methods for executing various applications, such as a workflow schedule, as well as a computer-readable medium having computer-executable instructions for performing the steps of the methods. The schedule features user defined transaction boundaries and associated semantics, as well as latency attributes and compensation parameters associated with actions within the schedule. Selective dehydration and rehydration of the schedule is provided according to system variables and latency attributes. In addition, selective compensation of certain actions is provided according to compensation parameters and transaction boundaries in the schedule.

According to one aspect of the invention, a method of processing transactions is provided which includes persisting schedule state information or data associated with an action or transaction into a storage medium based on a latency attribute associated with an action or transaction. More particularly, the method includes selectively comparing a latency attribute with a latency threshold, and selectively storing the information and/or data in a storage medium based on the latency comparison.

According to another aspect of the present invention, a method is provided for the execution of a workflow schedule including selectively compensating a first action or transaction during the execution of a schedule. The method more particularly includes determining the action state of a second action, determining the relationship of the first and second actions based on the transaction boundary if the action state of the second action is aborted, determining the action state of the first action if the first and second actions are related according to the transaction boundary, and taking an action according to the compensation parameter and/or compensation routine associated with the first action if the action state of the first action is committed.

According to still another aspect of the invention, a computer-readable medium is provided having computer-executable instructions for executing a schedule, comparing a latency attribute with a latency threshold, and selectively storing schedule state information and/or data in a storage medium based on the latency comparison.

According to yet another aspect of the invention, a computer-readable medium is provided having computer-executable instructions for executing a schedule, and selectively compensating an action or transaction according to a transaction boundary and a compensation parameter.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The foregoing and other aspects of the invention will become apparent from the following detailed description of the invention and the attached drawings in which.

DETAILED DESCRIPTION OF THE INVENTION

Figure 1:
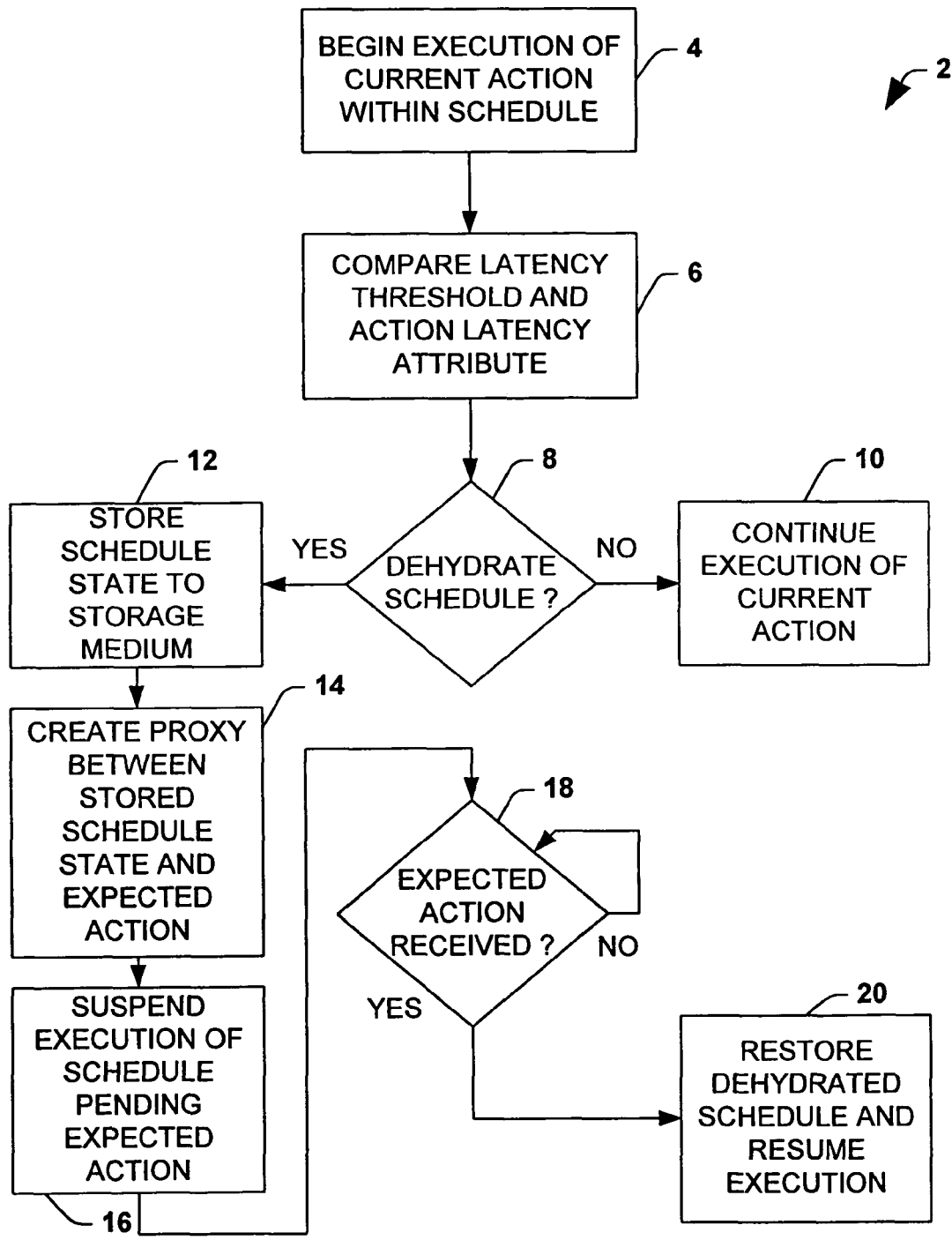
FIG. 1 is a flow chart illustrating a method of selectively dehydrating a schedule instance in accordance with the present invention.

The following is a detailed description of the present invention made in conjunction with the attached figures, wherein like reference numerals will refer to like elements throughout. According to one aspect of the invention, FIG. 1 shows a method 2 for executing a schedule including selective dehydration. The methods for selective dehydration and rehydration illustrated hereinafter may be embodied in a computer-readable medium having computer-excecutable instructions for performing the steps of the methods in accordance with another aspect of the invention.

Dehydration generally refers to a method of selectively storing a schedule state in a storage medium based on latency considerations. For example, when an action in a schedule is expected to wait five hours for an incoming message, the schedule state may be dehydrated to disk until the message is received. In such a situation, the system may perform other tasks until the message is received, thereby significantly improving the work output and efficiency of the system. At step 4 in FIG. 1, a current action in the schedule is initialized, and a comparison is made at step 6 between a latency threshold and a latency attribute.

In this regard, a latency threshold may represent a maximum time period above which a system will dehydrate a schedule instance while waiting for an action to complete. A latency attribute may represent the expected or estimated time the corresponding action will take to complete. The latency threshold is generally a system threshold value or a dynamically computed value (e.g., based on system resource loading or utilization), and the latency attribute is an attribute of an action or transaction, as will be discussed further hereinafter. Based on the latency comparison, a decision step 8 either continues execution of the current action in step 10, or dehydrates the schedule instance according to steps 12, 14, and 16.

At steps 12, 14, and 16, the schedule instance is dehydrated by storing the schedule state in a storage medium, creating a proxy between the stored schedule state and an expected action (e.g., a message), and suspending execution of the schedule pending the expected action. As an example, the expected action may be a message that the action must receive in order to complete, and the latency attribute may be an estimate of the time before the message will be received. In this regard, the latency attribute may be a fixed value determined by a user while defining a schedule, or alternatively may be a variable which can be updated based on one or more variables, as discussed further hereinafter.

Decision step 18 subsequently restores or rehydrates the dehydrated schedule in step 20 when the expected action has been received, for example, when an expected message is received. By this method, a schedule having actions with a latency greater than the latency threshold may be dehydrated from execution for a time, while allowing system resources previously associated with such actions to be used for other tasks. Additional details relating to the dehydration of a schedule instance will be discussed in greater detail infra.

Figure 2:
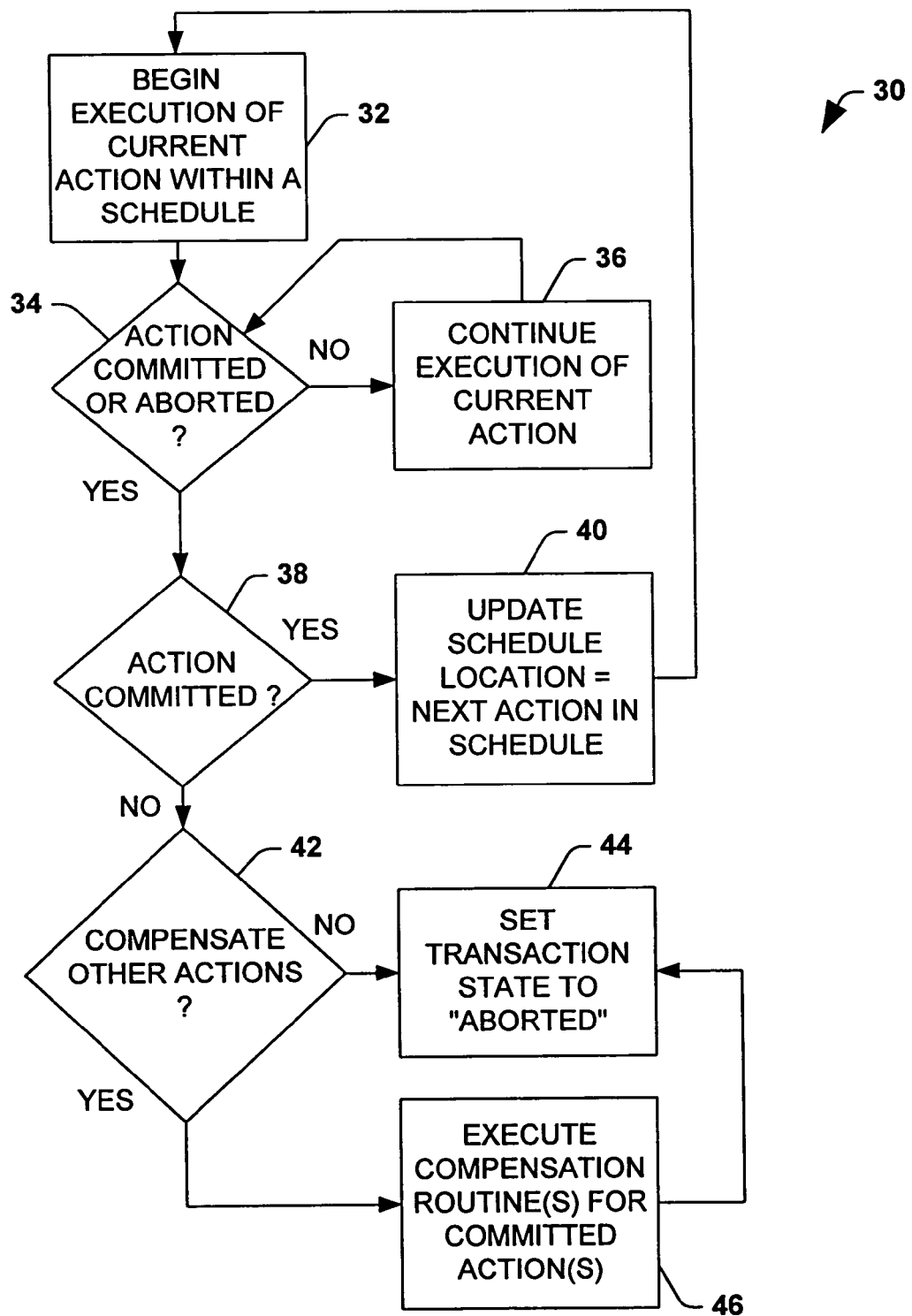
FIG. 2 is a flow chart illustrating a method of selectively compensating data in accordance with the present invention.

In accordance with another aspect of the invention, FIG. 2 shows a method 30 for executing a schedule including selective compensation. The invention, moreover, includes a computer-readable medium having computer-executable instructions for performing the steps of the selective compensation methods, as discussed further hereinafter. Compensation generally refers to restoring data to a previous state, and may additionally or alternatively include creating object instances, sending messages, or performing other operations.

Selective compensation comprises performing such operations based on schedule transactional characteristics. Such characteristics may include the relationships between actions and transactions within a schedule, as well as the respective states of such actions or transactions. Once it is determined that an action or transaction needs to be compensated, the invention further contemplates that the specific compensation acts to be performed are user definable. In this regard, compensation may include running or executing a compensation routine or script associated with the action or transaction. As discussed further hereinafter, selective compensation allows improved access to data, thereby facilitating execution of long running transactions, as well as providing other advantages.

Once a current action has been initialized in step 32, a decision step 34 determines whether the action has committed or aborted. If not, execution continues in step 36. Once the current action either commits or aborts, decision step 38 determines whether the action has committed. If so, step 40 updates the schedule location, and execution of the next scheduled action is begun in step 32. Alternatively, when a current action aborts, decision step 42 determines whether other actions or transactions within the schedule need to be compensated. If not, step 44 sets the state of the current transaction to "aborted," and no compensation is performed. If compensation is required for actions and/or transactions, one or more compensation routines are executed in step 46. By this method, the decision of whether compensation is needed for actions or transactions is made during schedule execution. If such compensation is required for a committed action or transaction, the specific compensation routines associated therewith are called or executed.

Figure 3:
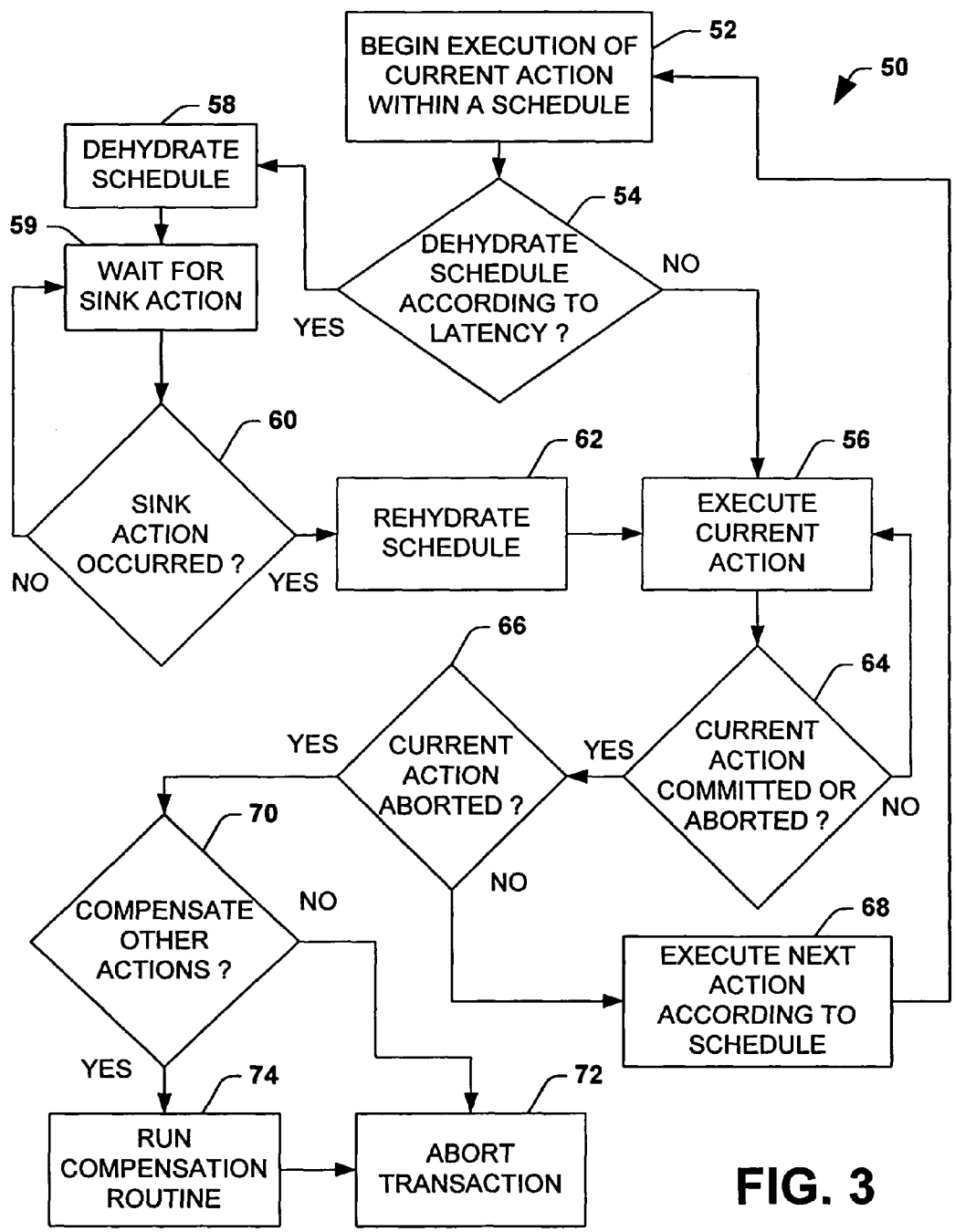
FIG. 3 is a flow chart illustrating a method for executing long running transactions in accordance with the present invention.

In accordance with another aspect of the invention, FIG. 3 illustrates a method 50 of executing a schedule including long running transactions. Also provided by the present invention, is a computer-readable medium having computer-executable instructions for performing the steps of the methods. Long running transactions are transactions which take a long time to execute. Such transactions may include those which must wait for external events to occur prior to, or in between, performing useful work. Efficient execution of long running transactions is achieved according to the invention, by providing selective dehydration based on latency considerations, and selective compensation based on transaction boundaries, as discussed in more detail infra.

Execution of a current action in a schedule is begun in step 52 and decision step 54 determines whether the schedule is to be dehydrated according to latency considerations. If not, the current action execution continues in step 56. If dehydration is selected, the schedule is dehydrated in step 58 pending receipt of a sink action in step 59. The pending sink action may include receipt of a message or other stimuli from an external source. Subsequently, decision step 60 determines whether the sink action has occurred, (such as by receipt of an expected message), and if so the schedule is rehydrated in step 62, whereupon execution of the current action proceeds in step 56.

Once execution of the current action is completed, decision step 64 then determines whether the current action has either committed or aborted, and if so, decision step 66 determines whether the action has aborted. If the action has committed, then the next scheduled action is executed in step 68. However, if the current action has aborted, decision step 70 determines whether compensation of other actions or transactions is appropriate. If not, the current transaction, containing the action at issue, is aborted. If compensation is selected, a compensation routine is run in step 74 before the transaction is aborted in step 72.

Workflow Applications Overview

Several aspects of the invention will hereinafter be described in detail in connection with application of workflow technology to an Internet customer transaction and a bank loan application process. Such applications have been selected because of their ability to clearly convey the various aspects of the invention. It will be appreciated, however, that the invention finds utility in a variety of applications and that the illustrated processes are discussed merely to provide illustration and context for the various novel features of the invention.

Consumer Transaction Workflow

Figure 4:
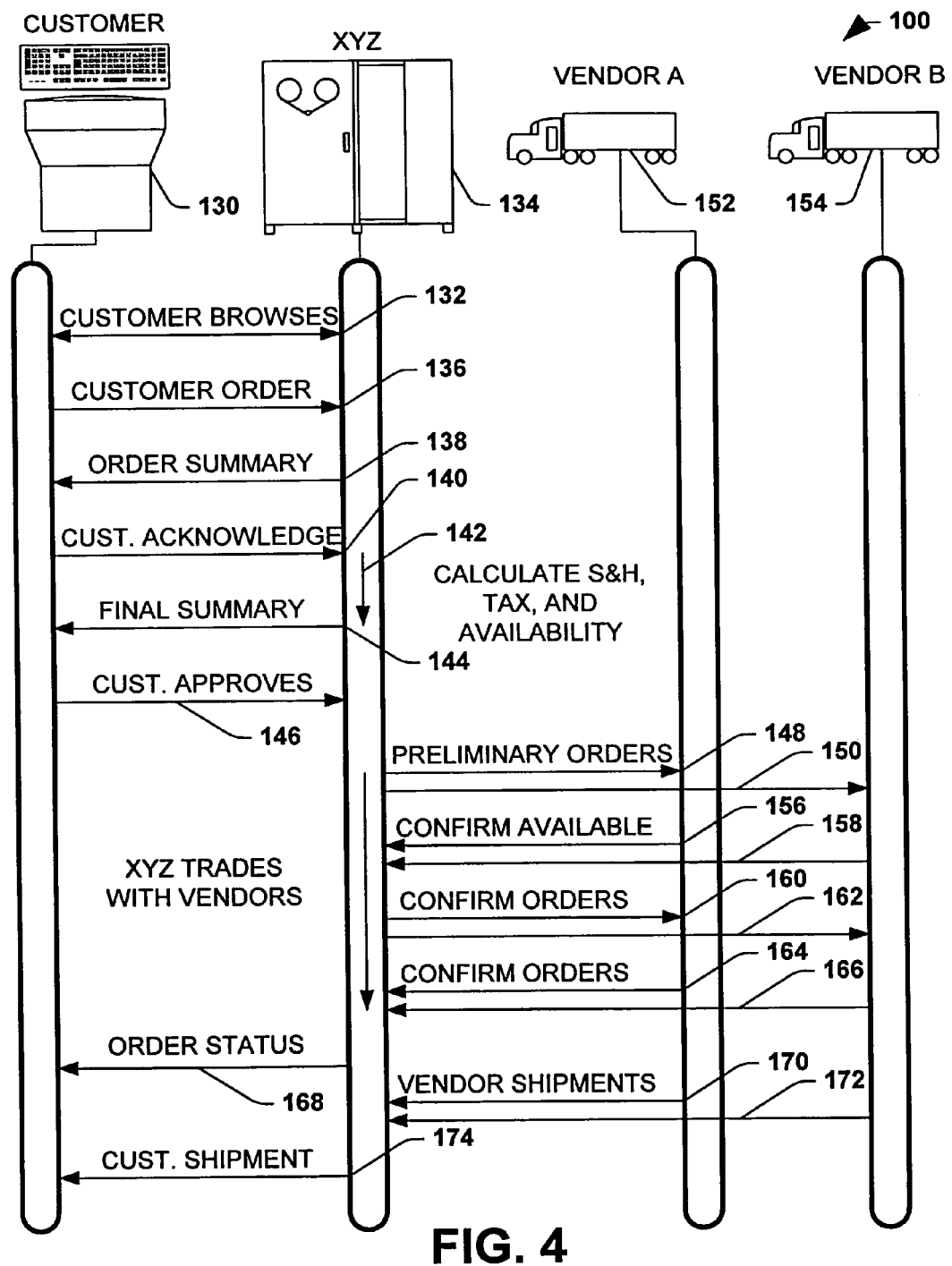
FIG. 4 is a schematic illustration illustrating an exemplary workflow.

Referring now to FIG. 4, an exemplary interactive workflow 100 is illustrated, wherein a customer having a computer 130 accesses the Internet at step 132 to browse the web page of XYZ Corporation 134. The customer 130 places an order 136, which is then summarized by XYZ 134 at 138. The summary 138 is acknowledged by the customer 130, and XYZ 134 then calculates the shipping and handling charges, taxes, and availability of the order 136 at step 142, and sends a final summary 144 to the customer 130 at step 144. The customer may then approve the order at step 146. Thereafter, XYZ 134 sends preliminary orders 148 and 150, respectively, to vendor A 152 and vendor B 154, which are confirmed by messages 156 and 158, respectively. XYZ 134 then confirms the orders with messages 160 and 162, causing subsequent confirmation messages 164 and 166 to be sent to XYZ 134 by vendors 152 and 154, respectively. At this point, XYZ 134 sends an order status message 168 to the customer 130. After the shipments 170 and 172 arrive at XYZ 134 from vendors 152 and 154, the desired product 174 is shipped to the customer 130.

Workflows such as that of the flow diagram of FIG. 4 may be defined in the form of a schedule for execution in a computer system. A schedule may include a set of actions having specified concurrency, dependency, and transactional attributes associated therewith. Each schedule has an associated schedule state, which includes a definition of the schedule, the current location within the schedule, as well as active or live data and objects associated with the schedule. Within a schedule, transaction boundaries may exist based on groupings of actions. In this regard, a transaction may encompass individual actions, or transactions, or groups thereof. As discussed further hereinafter, actions may be grouped into sequences, which are executed in serial fashion, as well as tasks in which the actions are executed concurrently. Based on the groupings, therefore, concurrency may be resolved for the actions and transactions within a schedule.

Actions correspond to the work that is done within a schedule and are the basic unit of composition therein. According to the invention, such actions may include attributes relating to latency and compensation, either alternatively or in combination, within the context of a schedule. In addition, concurrency of action execution may be embedded into a schedule via one or more concurrent constructs, for example, a task construct. Two types of actions exist; sink actions and source actions. Sink actions send externally originating stimuli to a schedule, thereby allowing external programs to advance the schedule state. These stimuli may be an event, a message, or a call on a guarded component. In the case of an event, the running schedule acts as a subscriber. Where the first action in a schedule is a sink action, a new instance of a schedule will be instantiated as a result of a message (or call or event) being received.

Source actions drive method calls on components. Such source actions typically instantiate a component, (create an instance of the component, unless the action refers to a pre-created instance of the component), call a method on the instance, and subsequently release the reference to the instance if it is not used later in the schedule.

When an application executes a schedule, an instance of a scheduler engine is created and the schedule and an associated binding are loaded. Actions, moreover, may include information regarding the expected or actual completion time or latency in accordance with the invention. This information may be embedded in the schedule definition when the schedule is being defined or when a binding is being created. In addition, latency attributes may be provided dynamically at runtime based on historical or predictive information about the latency of the action.

Ports are used by a schedule to define references to a component instance. Ports may be passive or active. Passive ports are entry points into a schedule for an external event to advance the schedule state. Active ports are used to send messages. An active port may also map to a method call by the schedule instance on a component instance that the port is bound to. References in a schedule to a port are associated with or bound to references to a message queue (or a component) by a process called binding. The schedule is thus created with reference to particular technologies and components that implement the desired behavior. Different bindings may be created for a single schedule, each binding specifying the particular components to be used in a given application. In practice, a schedule may be defined for an inter-business process, and reused for several combinations of businesses, wherein a different binding is created for each company implementing the process. The schedule itself is therefore portable.

Schedules may be created or defined using various workflow tools including a scheduler language and graphical user interfaces. The schedule definition includes port references, action definitions, task and sequence definitions, transaction definitions including definitions of action groupings within transactions, transaction boundaries, compensation parameters or attributes, and concurrency information. Constants can be provided to a schedule as initialization parameters by building the constants into the schedule as instance parameters when the schedule is instanced, as well as by invoking a component associated with a source action within the schedule. In the latter case, the parameters of the invoked method represent the initialization parameters.

Once a schedule is defined, a binding is created which resolves references in the schedule to ports into references to specific components. As discussed above, several different bindings may be created for a single schedule, according to the specific technology with which the schedule is to be employed. Particular bindings are created according to the specific technology using binding tools such as software programs.

Loan Application Workflow Schedule

Figure 5:
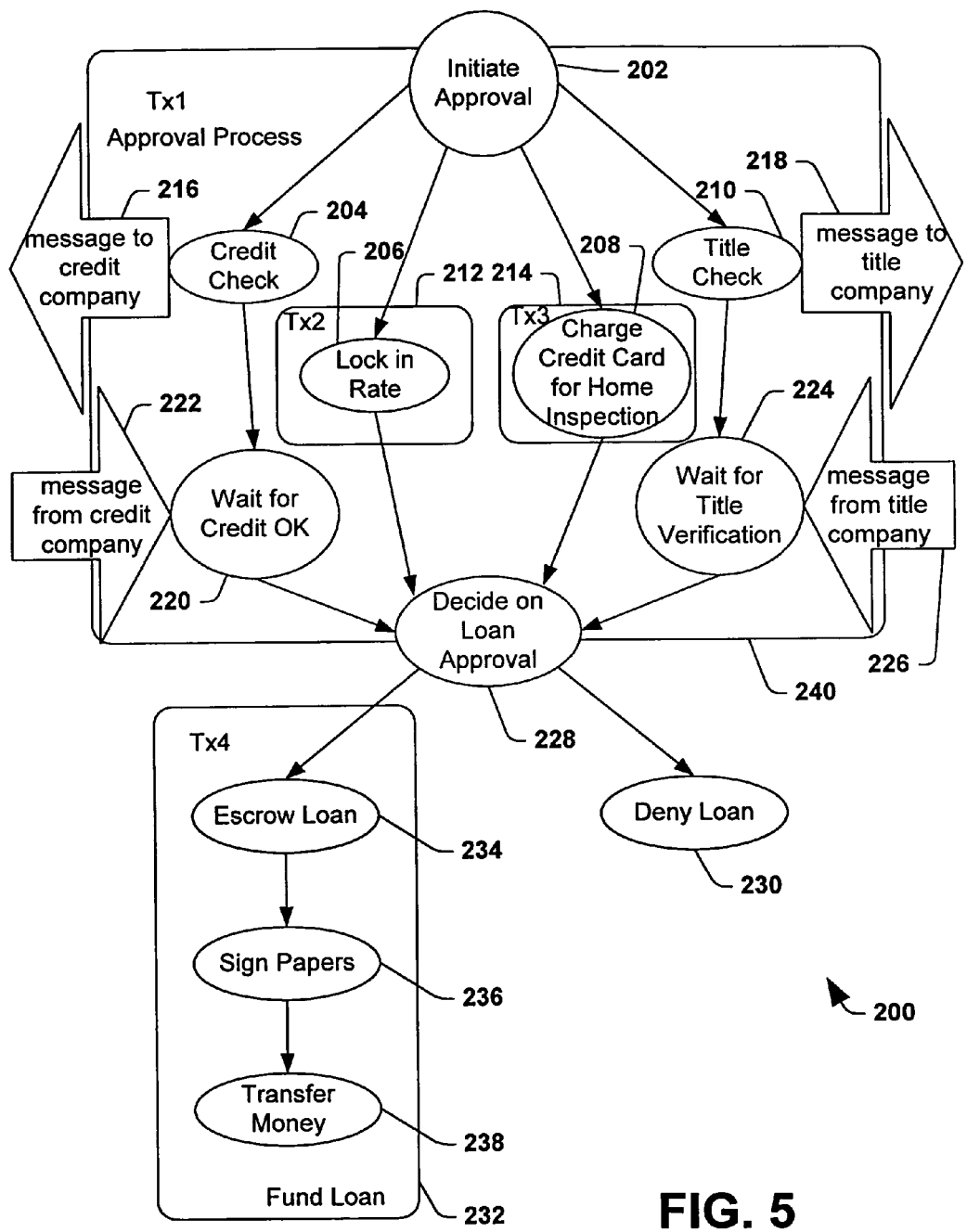
FIG. 5 is a block diagram illustrating a workflow schedule relating to a home loan application process.
Figure 6:
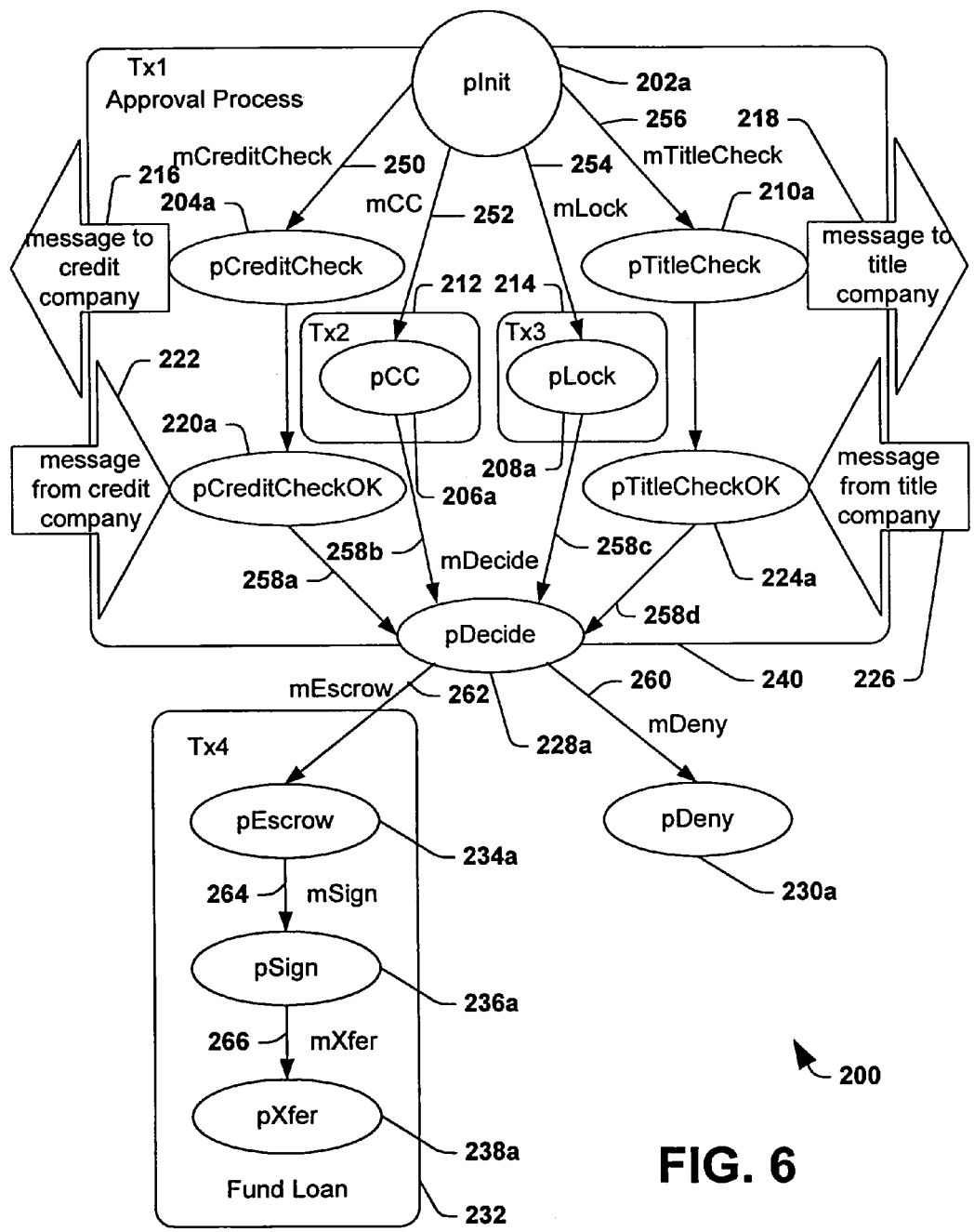
FIG. 6 is a block diagram illustrating the workflow schedule of FIG. 5 relating to a home loan application process with messages and ports abstracted.

FIGS. 5 and 6 illustrate block diagram representations of an exemplary loan application workflow schedule. This example will be used hereinafter to illustrate various aspects of the present invention. However, it will be recognized that many different applications are possible using the present invention, and that the illustrated example is not a limitation thereof. The various aspects of the invention, moreover, can be implemented in the exemplary operating environment described hereinafter, as well as other systems.

FIG. 5 shows a schedule 200 for executing a loan application approval process in which a loan applicant, not shown, has applied for a loan related to home ownership. Once the loan officer, not shown, has prepared the application, the application approval process begins at action 202. With the approval process initiated, four concurrent actions are started including a credit check action 204, a lock in rate action 206, a charge credit card for home inspection action 208, and a title check action 210. Actions 206 and 208 are synchronous, and complete atomically within transactions Tx2 212 and Tx3 214, respectively. A transaction's changes to a state are atomic if either all of the changes happen, or none of the changes happen. The changes may include database changes and messages, as well as other acts. Actions 204 and 210 are asynchronous, and involve sending messages 216 to a credit company and 218 to a title company, respectively.

Action 220 asynchronously waits for a credit OK reply message 222 from the credit company, and action 224 asynchronously waits for a title verification reply message 226 from the title company. The loan approval decision is made in action 228 based on the credit OK message from action 220, the locked loan rate from action 206 in transaction TX2 212, the credit card charge from action 208 in transaction Tx3 214, and the title verification from action 224. Based on the approval decision in action 228, either the deny loan action 230 or the actions of a fund loan transaction Tx4 232 are executed. Transaction 232 includes a sequence of an escrow loan action 234, a sign papers action 236, and a transfer money action 238. Transaction Tx1 240 contains all the work of actions 202-210, 220, and 228, and includes transactions Tx2 212 and Tx3 214.

FIG. 6 illustrates the schedule of FIG. 5 wherein the components of the schedule are abstracted as ports and messages. In particular, actions 202, 204, 206, 208, 210, 220, 224, 228, 230, 234, 236, and 238 of FIG. 5 have been abstracted in FIG. 6 as ports pInit 202a, pCreditCheck 204a, pCC 206a, pLock 208a, pTitleCheck 210a, pCreditCheckOK 220a, pTitleCheckOK 224a, pDecide 228a, pDeny 230a, pEscrow 234a, pSign 236a, and pXfer 238a, respectively. In addition, the messages represented as arrows between actions, have been abstracted as messages mCreditCheck 250, mCC 252, mLock 254, mTitleCheck 256, mDecide1 258a, mDecide2 258b, mDecide3 258c, mDecide4 258d, mDeny 160, mEscrow 262, mSign 264, and mXfer 266, as shown in FIG. 6.

Dehydration and Rehydration

Figure 7A:
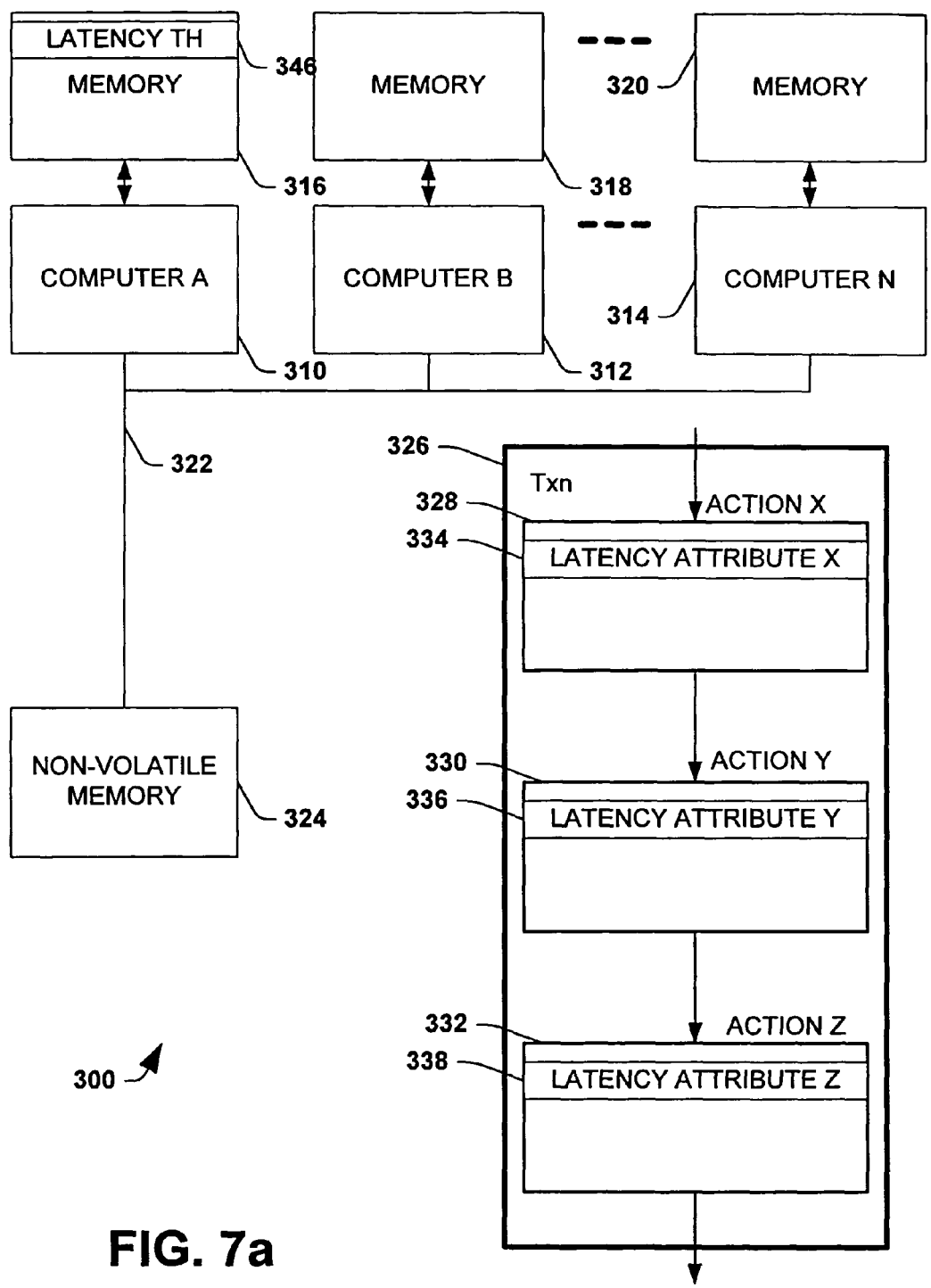
FIG. 7a is a block diagram illustrating a workflow schedule transaction running in a computer system in accordance with the invention.

Now that the basics of a workflow schedule are understood, an aspect of the present invention will now be discussed in greater detail, using a workflow schedule to aid in understanding the various features. Recall that FIG. 1 illustrates a method 2 for executing a schedule including selective dehydration. Referring also to FIGS. 7a, 7b, 7c, and 7d, this aspect of the present invention will be described in greater detail, and includes a method of executing a schedule in a computer system 300. FIG. 7a show a system of networked computers including computer A 310, computer B 312, and computer N 314; the computers 310, 312, and 314 having a memory 316, 318, and 320 associated therewith, respectively. A network 322 connects computers 310, 312, and 314 to one another as well as to a non-volatile storage memory unit 324. A workflow application, not shown, which is executed by computer A 310 includes a schedule instance, (not shown).

The schedule instance includes a transaction Txn 326 as illustrated in FIG. 7a, which itself includes three actions, action X 328, action Y 330, and action Z 332. Each action 328, 330, and 332 respectively has latency attributes 334, 336, and 338 associated therewith, respectively. A latency threshold 346 may be stored in the memory 316 of the computer 310, or elsewhere, as may be desired. Latency attributes 334, 336, and 338 represent the expected or actual latency of the actions 328, 330, and 332, such as the time it takes for the action to be completed, and, like the latency threshold 346, may be set by a user, may be a system default, or may be a dynamic function of one or more variables. In this embodiment, the schedule instance along with the associated transactions and actions are stored in the memory 316 and are executed by the computer 310; however, it will be recognized that individual actions may alternatively be executed in other computers such as computers 312 and/or 314, as determined based on workload allocation and other considerations.

Figure 7B:
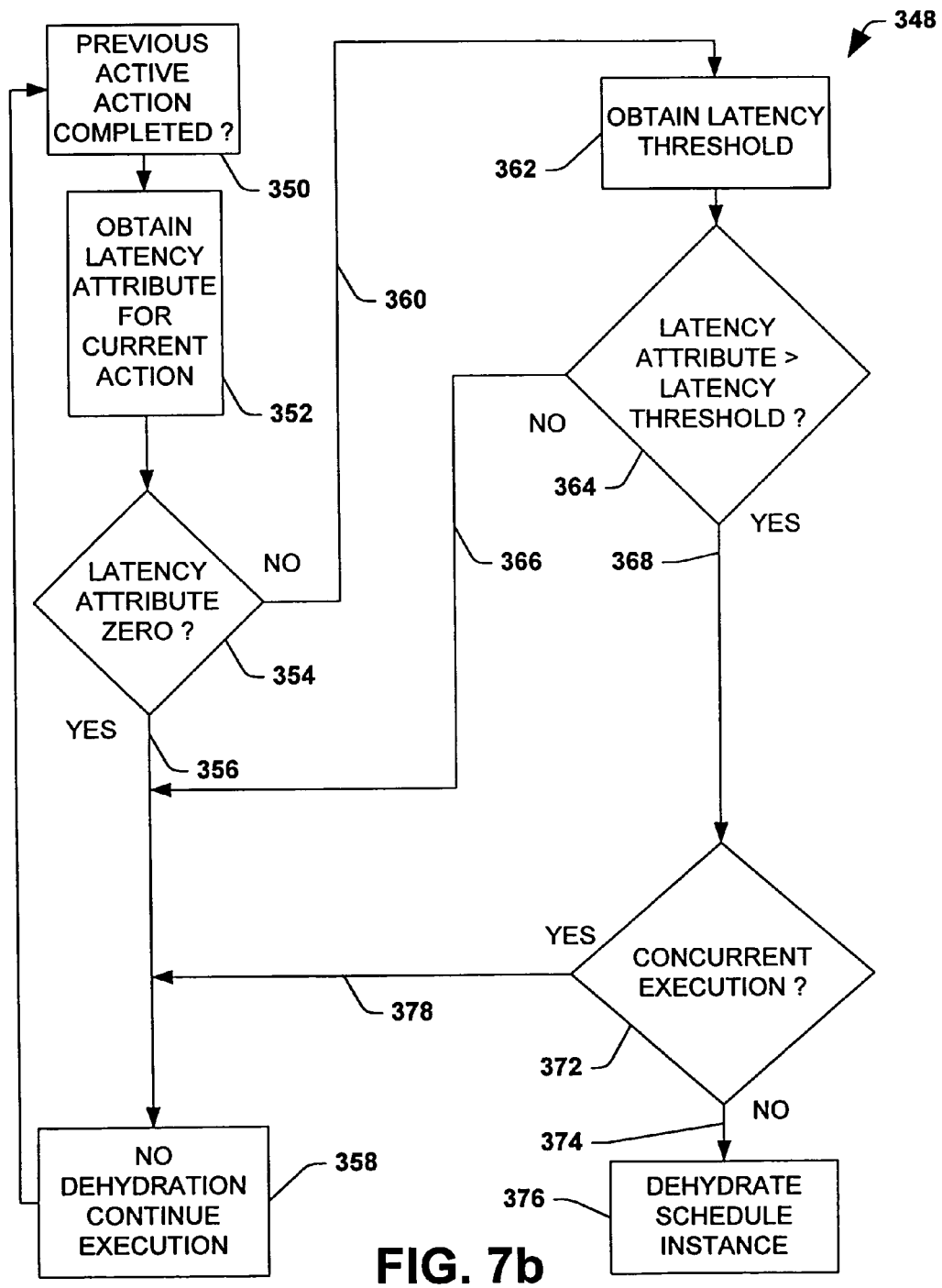
FIG. 7b is a flow chart illustrating a method of selectively dehydrating a schedule instance in accordance with the invention.

Referring also to FIG. 7b, a method of executing individual actions within a workflow schedule is illustrated wherein the latency attributes highlighted in FIG. 7a for an action are used to selectively dehydrate a schedule state based on a comparison with a latency threshold. As individual actions 328, 330, and 332 are executed in the computer 310, the schedule state, not shown, is updated with the schedule location information, including the current action being executed. In the following discussion, it is assumed for sake of illustration, that latency attributes 334, 336, and 338 are zero, 150, and 300, respectively, and further that the latency threshold 346 has a value of 200. It will be further noted that these actions 328, 330, and 332 are not concurrent.

After completion of a previous action, not shown, when the schedule determines that the transaction Txn 326 is to be processed next, action 328, (Action X), will be executed according to the method 348 of FIG. 7b. Upon completion of the previous action in step 350, execution proceeds to step 352 where the latency attribute 334 for the current action 328 is retrieved from the memory 316 by the computer 310. Next, the decision step 354 is executed, wherein the latency attribute 334 is determined to be zero, which means that there is no expected latency associated with the action 328. Execution then proceeds down path 356, no dehydration occurs, and execution is continued in step 358.

Upon completion of the action 328 in step 350, the next action in transaction Txn 326 is action 330 (Action Y). In step 352, the latency attribute 336 for the action 330 is read by the computer 310 from the memory 316, and a zero check thereon is performed in step 354. Since the value of the latency attribute 336 for action 330 in this example is non-zero, execution proceeds down path 360 to step 362, wherein the latency threshold 346 is obtained from the memory 316. The latency attribute 336 is then compared to the latency threshold 346 in decision step 364. According to the latency comparison in step 364, execution proceeds down path 366 and no dehydration occurs since the latency attribute 336, (having a value of 150), is not greater than the value of the latency threshold 346, (in this example, 200).

Upon completion of the action 330 in step 350, the action 332, (Action Z), becomes the current action, and its associated latency attribute 338 is obtained by the computer 310 from the memory 316 in step 352. Because the value of the latency attribute 338 is non-zero, execution passes from decision step 354, down path 360, and to step 362, wherein the latency threshold 346 is read from memory 316. Assuming that the value of the latency threshold 346 remains 200, the latency comparison of the latency attribute 338 with the threshold 346 in decision step 364 determines that the attribute 338 is greater than the threshold 346. Execution accordingly proceeds down path 368 to decision step 372, where it is determined that the action 332 is not concurrent, and execution proceeds down path 374 to dehydration step 376. Concurrency may be determined based on whether the action is within a concurrent construct (not shown) in the defined schedule.

Had there been concurrent execution of action 332 with another action, execution would have proceeded down path 378 to step 358, and no dehydration would have occurred. It will be recognized that while the illustrated example performs no dehydration if there is concurrent execution, other methods are possible within the invention where, for example, dehydration could be performed where concurrent actions are executing. As an example, dehydration could be selectively postponed for a time while concurrent actions complete, wherein the actions are selectively allowed to complete based on separate latency comparisons or other factors. In this way, a system could wait for short latency concurrent actions to complete, before dehydrating a schedule based on a single concurrent action with a very long latency. In addition, considerations other than concurrent execution may be taken into account in determining whether a schedule will be dehydrated. For example, the system may forego dehydration when a schedule instance is not in a quiescent state, or where there are live ports in the schedule instance which cannot be persisted. Appropriate testing (not shown) may be performed for these and other conditions in determining whether or not a schedule instance will be dehydrated.

It will be noted that in the illustrated example, the latency threshold value remained at 200. However, as described more fully hereinafter, alternative embodiments are possible within the invention wherein the value of the latency threshold 346 is changed. In this regard, the latency threshold value can be a constant set by a system operator, or be a function of one or more system variables or conditions, such as load factors, and other system resource utilization indicators. It will therefore be appreciated that the present invention includes all such methods of providing a latency threshold. It will further be recognized that a latency attribute class may be associated with each action in a schedule and that several different latency thresholds may be provided, wherein latency attributes of different actions may be compared to different latency thresholds based on the class, thus allowing prioritization of certain actions with respect to determining whether or not to persist a schedule based on latency. Furthermore, transactions, as well as actions, may include latency attributes and schedules may similarly be dehydrated based on a comparison of a transaction latency attribute with a latency threshold.

Figure 7C:
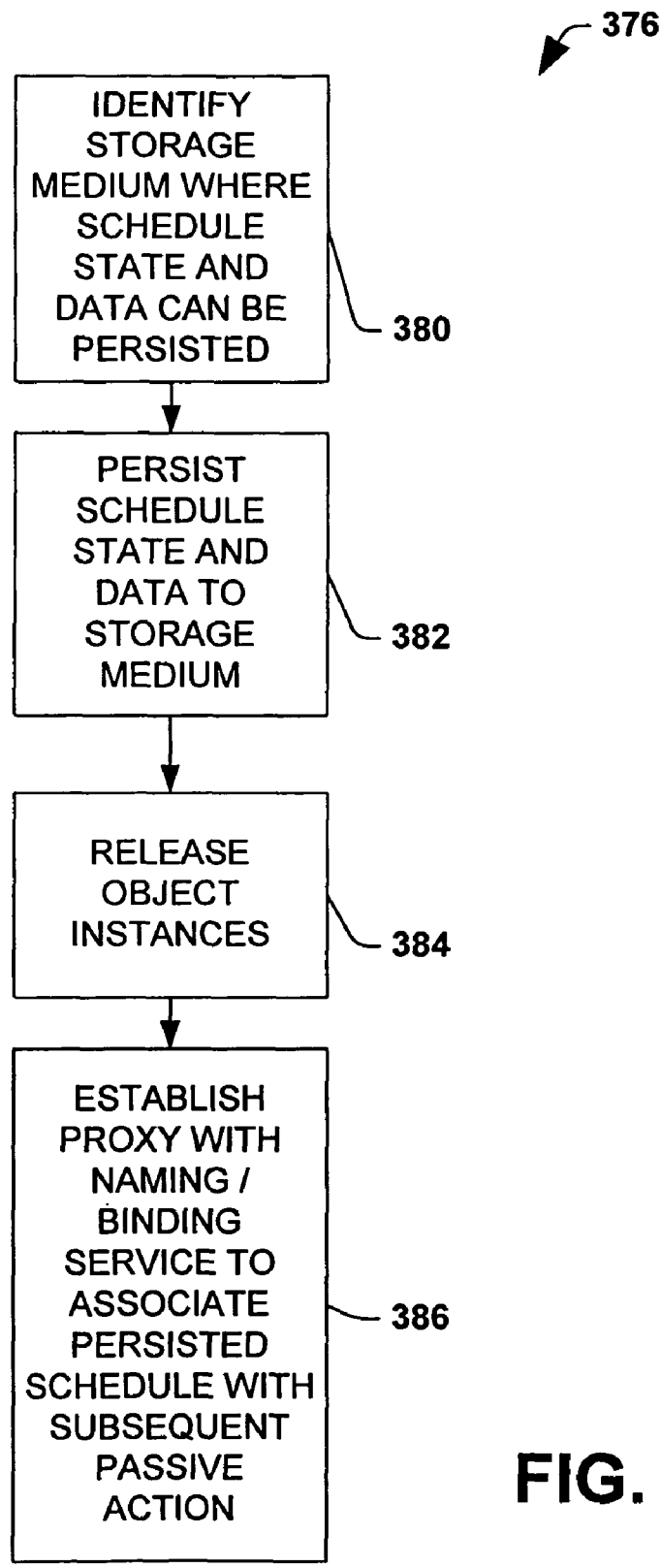
FIG. 7c is a flow chart illustrating a method of selectively dehydrating a schedule instance in accordance with the invention.

Referring also to FIG. 7c, a dehydration method will be described wherein a schedule state is persisted or saved to a disk or other non-volatile storage medium based on the latency comparison discussed above. In this regard, the storage medium may comprise, for example, a database, wherein the schedule state information and/or data associated with a schedule may be stored according to a database schema (not shown). Once it is determined that an action within a schedule has a latency attribute which exceeds a system latency threshold, and that there is no concurrent execution at that point in the schedule, dehydration begins with identifying a location in a storage medium wherein the schedule state may be stored or persisted, as per step 380 of FIG. 7c. Once a suitable location has been found, schedule state information is transferred to the storage medium in step 382, and all object instances associated with the schedule are released in step 384.

The schedule state information may include the current position within the schedule, as well as the live data and live objects associated with the schedule. In this example, the live data is data that is referenced in the schedule after the point of dehydration, i.e. the schedule position where dehydration was performed. Live objects in this example are those that are referenced in the schedule after the dehydration location. A proxy is then established in step 386 with the naming or binding service associated with the schedule instance in order to associate the persisted schedule state with a subsequent sink action. This allows the schedule to be rehydrated upon occurrence of an event, message, or signal, which may come from an external source. It will be further appreciated that while the illustrated example relates to dehydrating the schedule based on latency considerations, the invention further includes dehydrating an action or transaction based on latency considerations, wherein, for example, information and/or data associated with the action or transaction is stored in a storage medium pending receipt of an expected message or other external stimuli.

The dehydration of a schedule and/or actions and transactions within a schedule thus provides a method wherein long latency actions can effectively be suspended from execution during expected latency periods where the current action, transaction, or schedule would otherwise be accomplishing little or no work. This frees up system resources to service other tasks or programs, and consequently provides improved scalability and availability to systems in which long running transactions are to be executed.

Figure 7D:
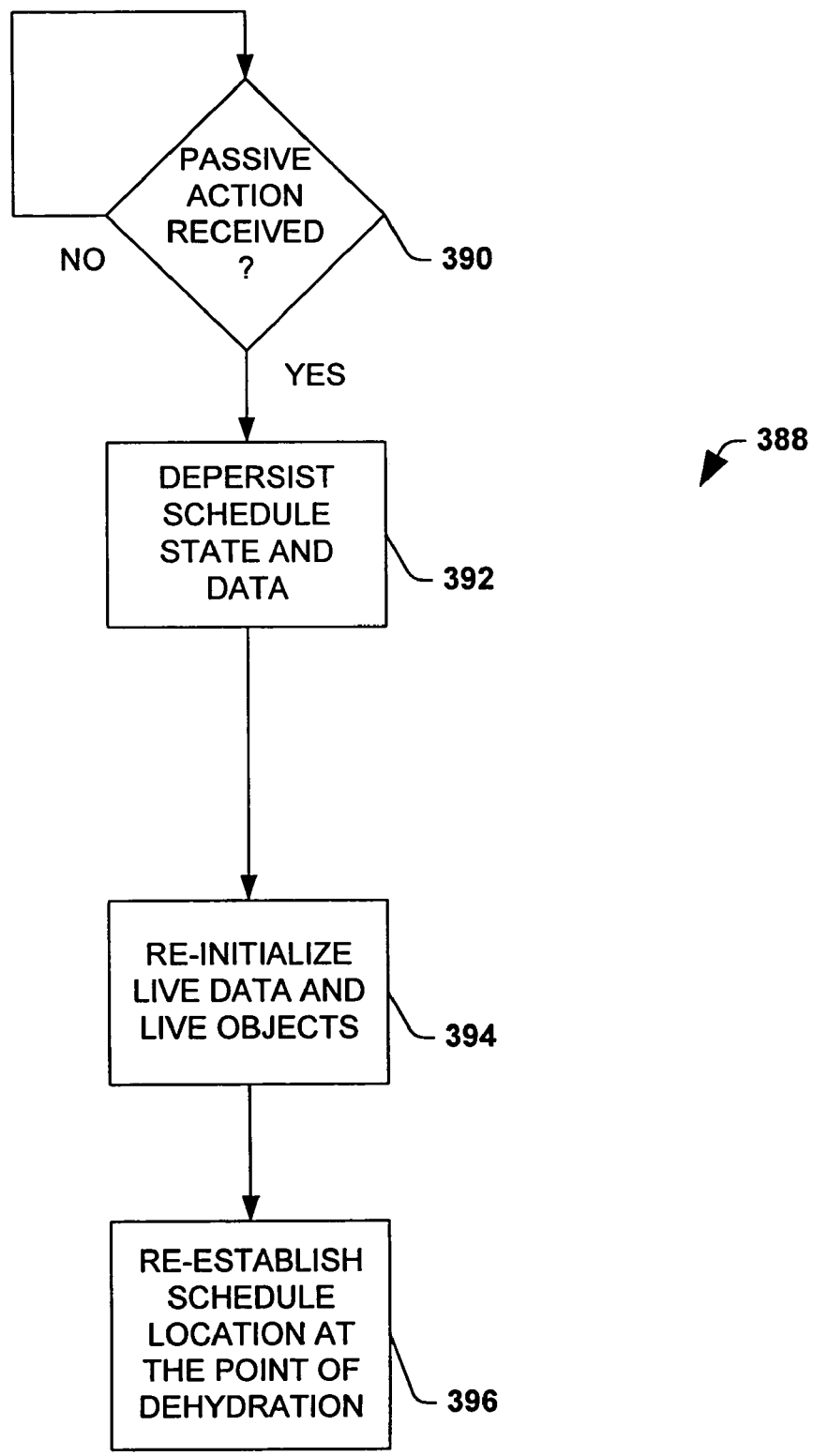
FIG. 7d is a flow chart illustrating a method for selectively rehydrating a schedule instance in accordance with the invention.

Referring now to FIG. 7d, a method 388 for rehydrating a schedule is shown. When an external event or signal (e.g., a message) triggers the system to resume execution of a dehydrated schedule instance in step 390, the schedule is then depersisted from the storage medium in step 392, and the live data and live objects associated with the dehydrated schedule are re-initialized in step 394. Depersisting in this context refers to the system reading the schedule state out of the storage medium and restoring the same into the system's memory for execution. The schedule location is then re-established at the point of dehydration in step 396, and execution of the schedule resumes.

Figure 8:
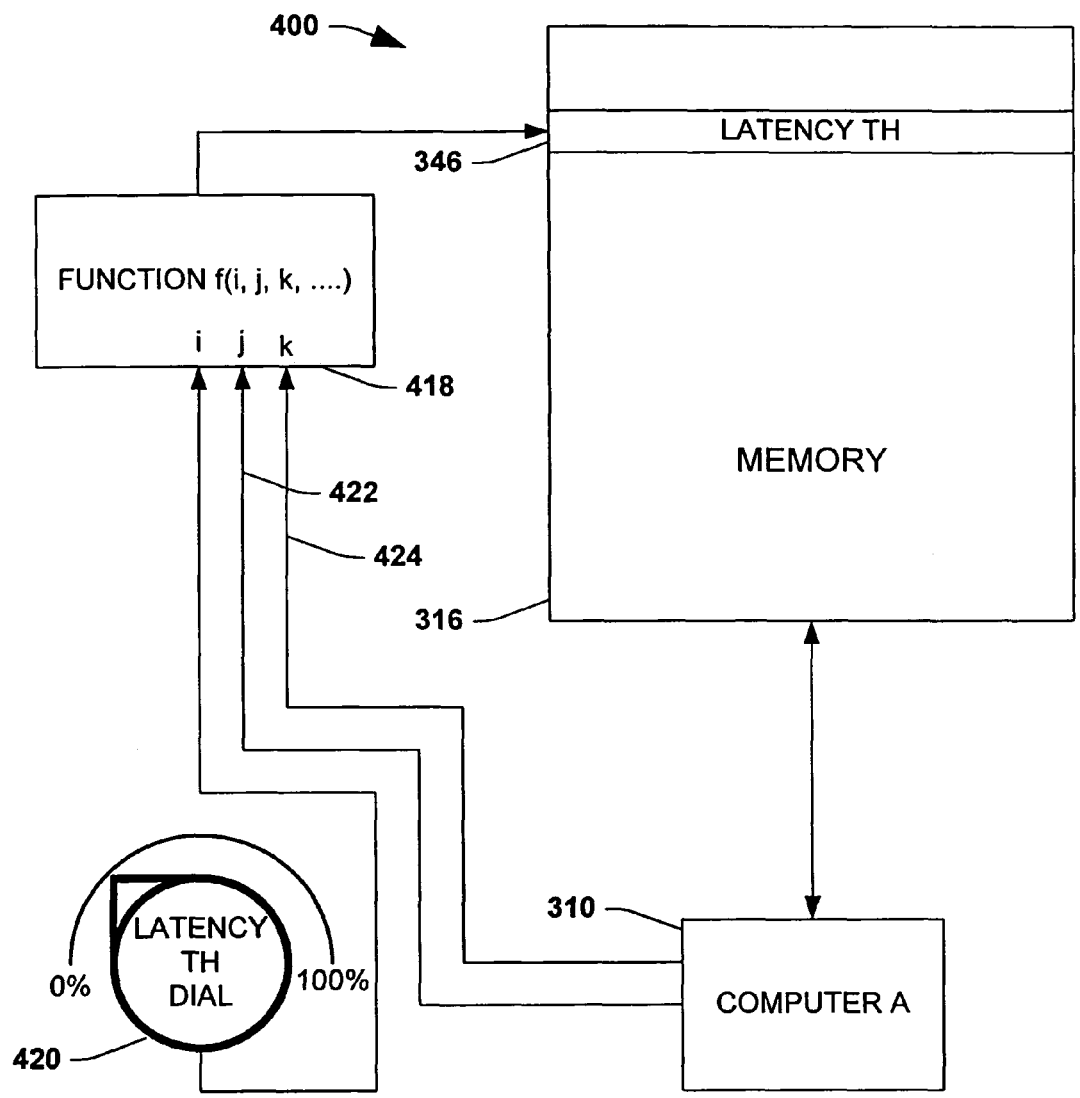
FIG. 8 is a block diagram illustrating a method for selectively dehydrating a schedule instance in accordance with the invention.

In FIG. 8, another method 400 of the invention is shown, wherein the value of the latency threshold 346 in memory 316 may be modified according to one or more variables based on a function 418. The latency threshold value in this embodiment is a function of the setting on a latency threshold dial or knob 420. For illustration only, the scale on the dial 420 is in percentage; however, it will be appreciated that the latency threshold value, as well as the values of the latency attributes 334, 336, and 338, are in general representative of time, and may be expressed in appropriate units thereof. This allows a system manager or operator to manually adjust the latency threshold above which schedules may be dehydrated.

The value of the latency threshold may also be a function of one or more system variables such as 422 and 424 in FIG. 8. The variables may be generated or provided to the function 418 by the computer 310. Alternatively, the latency threshold value may solely be a function of system variables such as 422 and/or 424. By this method, the latency threshold can be dynamically adjusted according to system requirements and/or operator settings in order to provide manual or closed loop refinement of one or more system performance characteristics such as, for example, system resource utilization or availability.

Figure 9A:
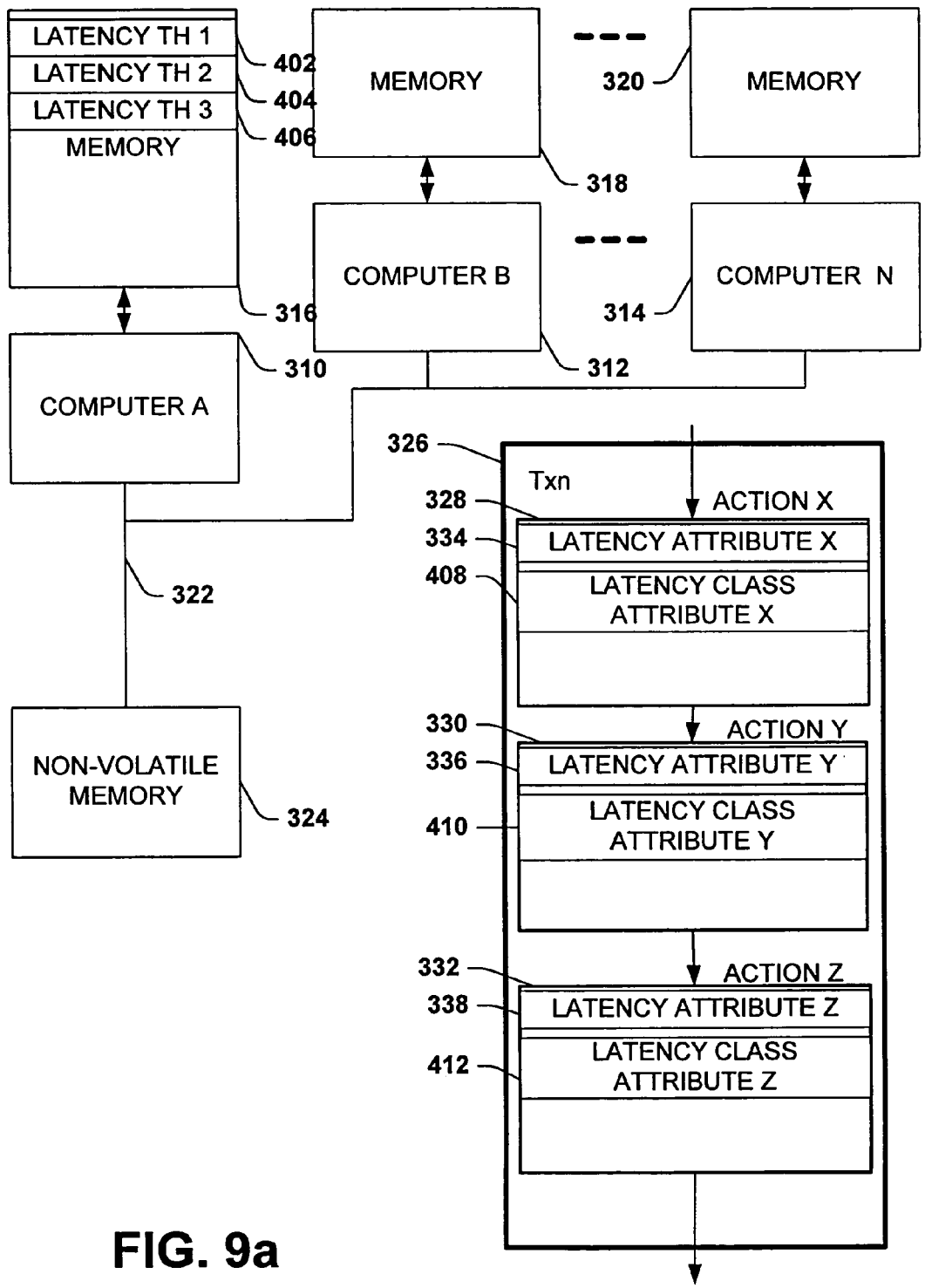
FIG. 9a is a block diagram illustrating a workflow schedule transaction running in a computer system in accordance with the invention.
Figure 9B:
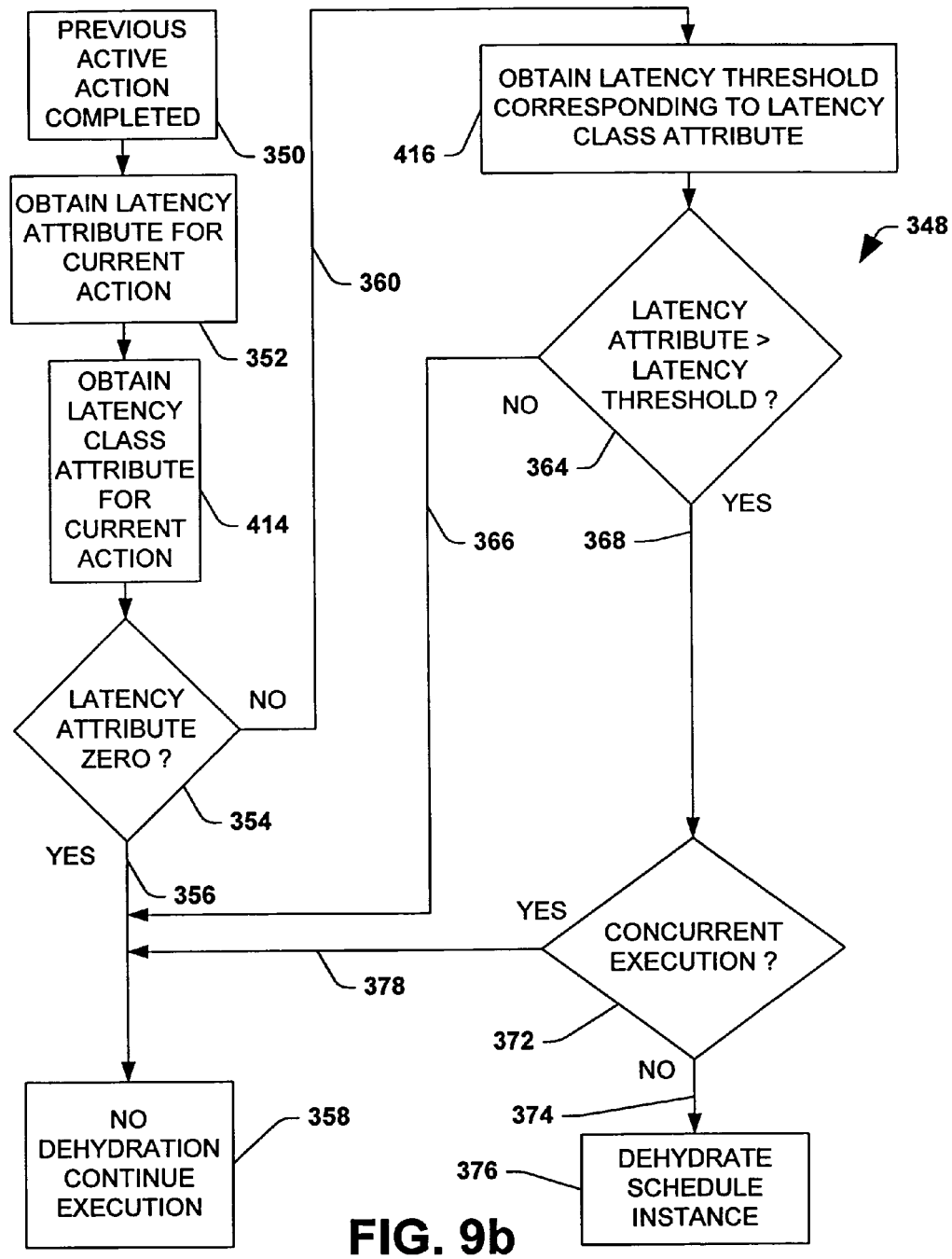
FIG. 9b is a flow chart illustrating a method for selectively dehydrating a schedule instance in accordance with the invention.

FIGS. 9a and 9b illustrate another aspect of the method shown in FIGS. 7a and 7b wherein similar reference designators are used where possible to indicate similar items. In FIG. 9a, the memory 316 associated with the computer 310 contains a plurality of latency thresholds 402, 404, and 406. Any number of such thresholds can be provided. In addition, actions 328, 330, and 332 of transaction Txn 326 are provided with latency class attributes 408, 410, and 412, respectively. In a method similar to that of FIG. 7b, the latency class attributes 408, 410, and 412 are used by the system to determine whether dehydration of an executing schedule is to be performed, as shown in FIG. 9b. As an illustrative example, latency thresholds 402, 404, and 406, respectively, are assumed to have values of 1000, 100, and 10, respectively, and it is further assumed that latency threshold 402 corresponds with action latency class attributes having a value of one, latency threshold 404 corresponds with action latency class attributes having a value of two, and so on.

When action 328 becomes current in the execution of transaction Txn 326 as part of a schedule running in the computer 310, the computer 310 will get the latency attribute 334 associated with action 328 as per step 352. Next, the computer 310 obtains the latency class attribute 408 for action 328 in step 414, performs a zero test on the attribute in decision step 354, and if non-zero, proceeds down path 360 to step 416. At this point, the latency threshold corresponding to the latency class attribute 408 is obtained from the memory 316. If the latency class attribute 408 has a value of one, latency threshold 402 is used; if the class attribute value is two, threshold 404 is used, and so on.

Assuming the latency class attribute has a value of one, threshold 402 is obtained by the computer 310 in step 416. Once the appropriate latency threshold is obtained according to the current action's latency class attribute, a comparison of the latency threshold 402 and the latency attribute 334 is performed in decision step 364. According to the latency comparison, a decision whether to dehydrate the schedule is made through steps 364 and 372, as described above in association with FIG. 7b. The invention thus provides for the possibility of different latency thresholds for different classes of actions. This feature allows static or dynamic prioritization of actions with respect to dehydration based on latency attributes.

Figure 10:
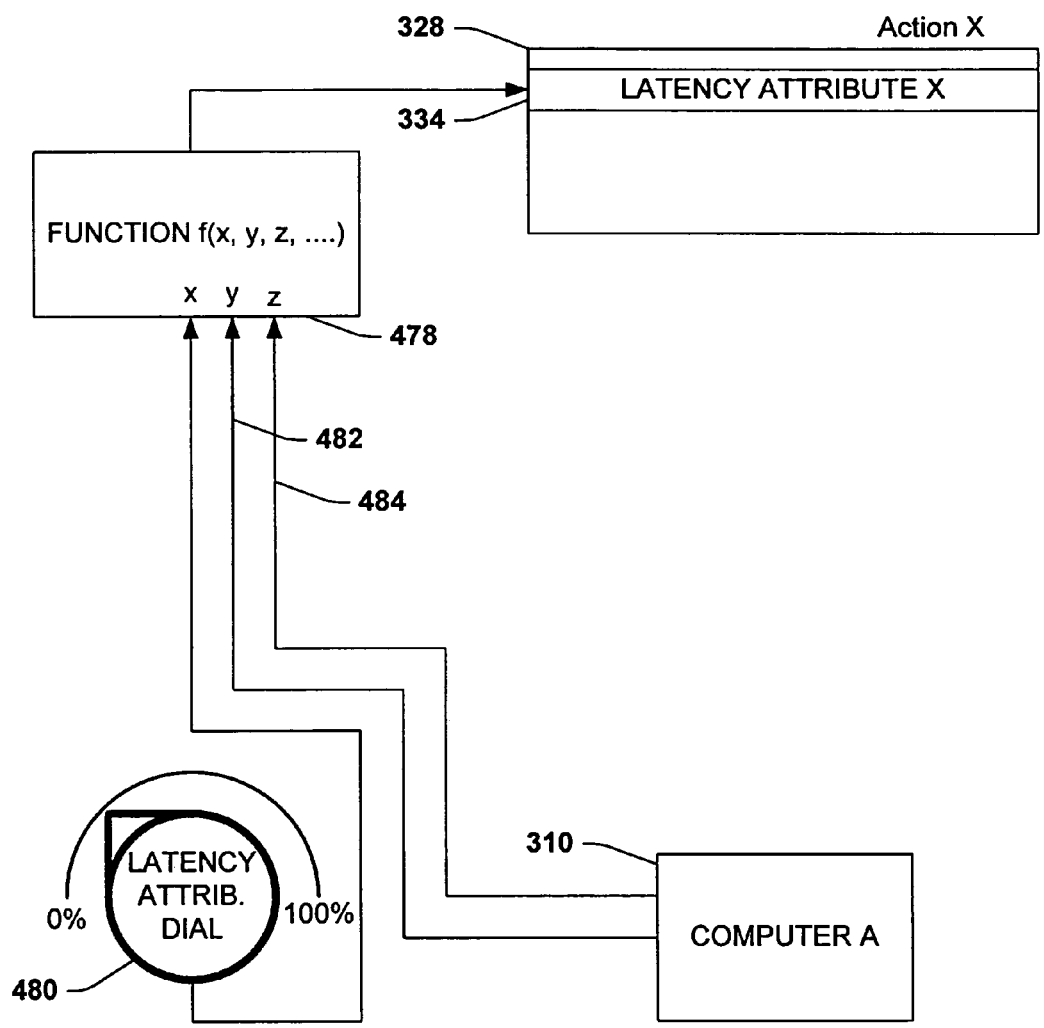
FIG. 10 is a block diagram illustrating a method for selectively dehydrating a schedule instance in accordance with the invention.

Referring now to FIGS. 10 and 7a, another embodiment of the invention is shown wherein the value of the latency attribute 334 of action 328 may be modified according to one or more variables based on a function 478. The latency attribute value in this example is a function of the setting on a latency attribute dial or knob 480. For illustration only, the scale on the dial 480 is in percentage; however, it will be appreciated that the value of the latency attribute 334, as well as the values of the latency attributes 336 and 338, are in general representative of time, and may be expressed in appropriate units thereof. An operator may thus manually adjust the latency attribute according to empirical or actual data in setting the latency attribute 334. The value of the latency attributes 334, 336, and 338 may further be a function of one or more system variables such as 482 and 484 in FIG. 10. The variables may be generated or provided to the function 478 by the computer 310. Alternatively, the function 478 may solely be based on one or more system variables such as 482 and/or 484. By this method, the latency attribute can be dynamically adjusted according to system variables and/or operator settings in order to improve or update the estimated latency of an action.

Compensation

According to another aspect of the present invention, compensation may be used to recover, reconstruct, and/or otherwise perform certain operations to account for data which has been modified. Selective compensation may be useful when certain actions within a transaction have already committed and modified their data, and subsequently, another action or transaction aborts or fails. The user may want the system to reconstruct the data modified by the committed actions, prior to aborting the transaction. It may further be desirable to send messages to other schedules, transactions, etc. to indicate that an action has aborted, or that data previously modified, is now to be restored, or even to indicate that the data will not be restored. The flexibility of selective compensation allows actions or transactions to commit their respective data as soon as their immediate parent transaction commits, without necessarily waiting for their ultimate parent or root transaction to commit. This frees up access to the data for use by other actions, transactions, programs, etc., which can substantially improve system efficiency, particularly where long running transactions are involved.

Figure 11A:
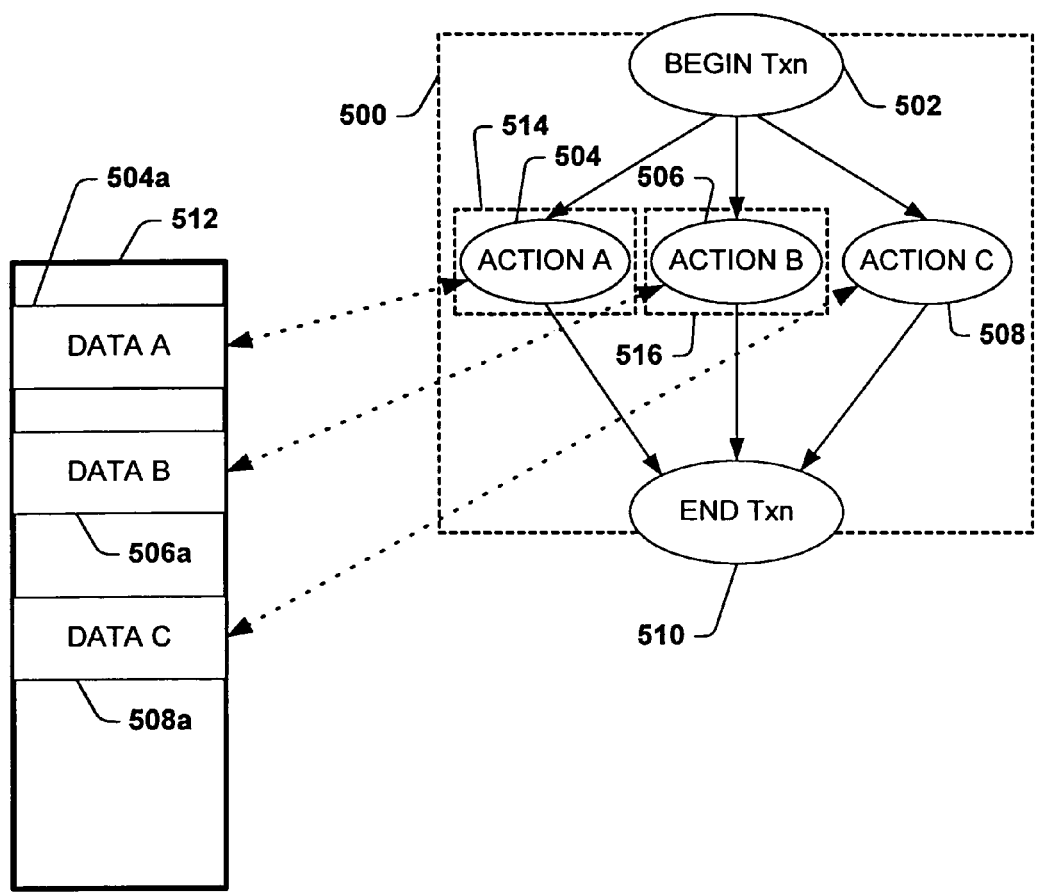
FIG. 11a is a block diagram illustrating an exemplary workflow schedule transaction running in a computer system in accordance with the invention.

As discussed supra, FIG. 2 shows a method for executing a schedule including selective compensation. Referring now to FIG. 11a, a transaction 500 is shown having a begin Txn action 502, action A 504, action B 506, action C 508, and an end Txn action 510. Subtransactions 514 and 516 are within parent transaction 500, and include actions 504 and 506, respectively. A memory 512 holds data A 504a, data B 506a, and data C 508a, which are operated on or used by actions 504, 506, and 508, respectively. While an action is executing, the data associated therewith is locked, i.e., other objects may not access the data. However, according to the present invention, isolation need not be preserved within the transaction boundary of the transaction 500. Thus, when an individual transaction 514, for example, commits (completes and modifies its data), the associated data A 504a is unlocked, i.e., any locks on the data A 504a are released.

By this relaxation of the data locking, the deleterious effects of long running transactions may be minimized or reduced with respect to allowing other actions, transactions, etc. to proceed, whereas had the data been further locked after action 504, committed, such actions or transactions would have to wait. In the situation where a failure or abortion actually occurs, moreover, the user may decide what to compensate and how it will be done. The invention thus allows much more flexibility that the conventional methods. A log, not shown, is maintained for the transaction 500, which records the operations performed within the transaction, including those of actions 504, 506, and 508, which may involve changing the data 504a, 506a, and/or 508a. Schedule state information may be stored or persisted in a storage medium at transaction boundaries, whereby compensation for committed actions and/or transactions may be provided, in the event of an aborted transaction or action. In this regard, the schedule state information may be stored to a storage medium, such as a database, according to a database schema. In addition, the invention provides for compensating data associated with an action or transaction, based on a compensation parameter associated therewith. Accordingly, an action may be compensated according to a compensation parameter, which may be dynamically variable, for example, those relating to time of day, date, etc.

Figure 11B:
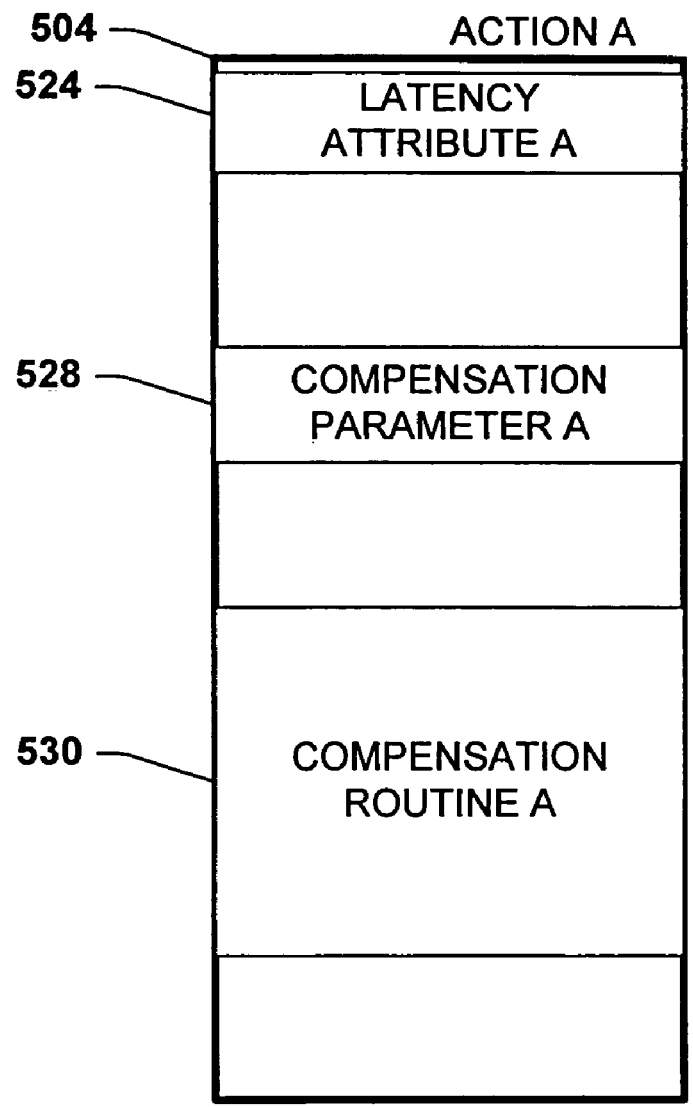
FIG. 11b is a block diagram illustrating a workflow action running in a computer system in accordance with the invention.

Referring also to FIG. 11b, action A 504 may include a latency attribute 524 as well as a compensation parameter 528 and a compensation routine 530. It will be appreciated that the latency attribute 524 is not required for the selective compensation method aspects of the invention, and is included in FIG. 11b merely for illustration. In order to illustrate various aspects of the invention, it will be assumed that action A 504, action B 506, and action C 508 run concurrently.

In FIG. 11a, the transaction 500 ends, i.e. commits, when the action 510 has committed. The structural location of the end Tx action 510 defines a transaction boundary. Similarly, a transaction boundary is established by the location of the begin Tx action 502. Execution of the action 510, however, is dependent on the actions 504, 506, and 508 successfully completing, as shown in FIG. 11a. Consequently, if one or more of the actions 504, 506, and 508 fail or abort, the action 510 and hence the transaction 500 must also fail or abort.

For illustration, it is assumed that during execution of the transaction 500, action A 504 as well as action B 506 complete successfully, thereby allowing sub transactions 514 and 516 to commit, after modifying the data A 504a and the data B 506a, respectively. After each sub transaction commits, the data associated therewith is unlocked. Thereafter, other objects, including for example schedules, transactions, and/or actions, may read, write, or otherwise modify or rely on the modified data 504a and/or 506a. Thus, once sub transaction 514 commits, data A 504a is unlocked. Assuming further that some time after sub transactions 514 and 516 commit, action C 508 aborts or fails, the state of the data A 504a and data B 506a is unreliable, because after sub transactions 514 and 516 committed, and before the action 508 aborted, data 504a and data 506*a* were unlocked. Hence, other objects, programs, etc., may have read, written, or otherwise modified or relied upon the data. This example illustrates why prior art transaction processing solutions would not allow transactions within a transaction to "unlock" their associated data prior to commission of the parent transaction. This prior art protection feature is sometimes referred to as isolation.

By the present invention, isolation requirements can be relaxed, reducing the time that data is locked to the time when transactions which modify the data are actually running. Once an object, such as an action, is finished, the data is unlocked, thereby allowing others to access the data. Selective compensation provides user with the ability to compensate for aborted or failed actions, etc., by, for example, recreating data that has or may have been modified, or by notifying other actions, etc. that the data may have been unreliable. As opposed to the conventional methods, therefore, the present invention provides a flexible compensation method, which may include automatic roll back, but is not limited thereto. Consequently, the aggregate time that data is locked may be decreased, and other objects are allowed access to data much sooner than was possible in the prior art. The present invention relaxes the prior art isolation requirement and allows data associated with one or more actions within a transaction to be unlocked upon commission. Further, the present invention addresses the potential problem of unreliable data associated with unlocked actions using a method of selective compensation, as will be discussed in greater detail below.

Figure 11C:
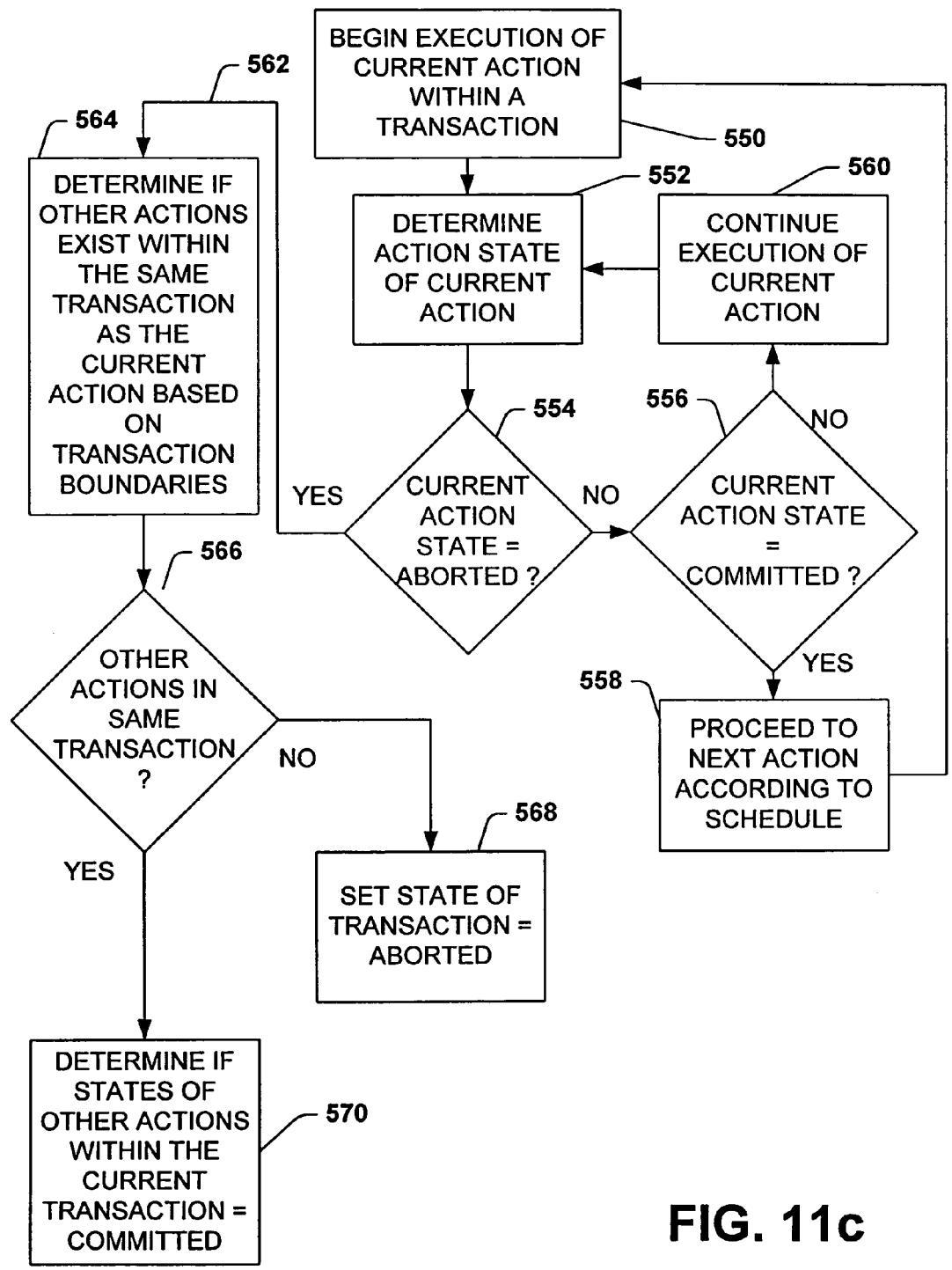
FIG. 11c is a flow chart illustrating a method for selectively compensating data in accordance with the invention.
Figure 11D:
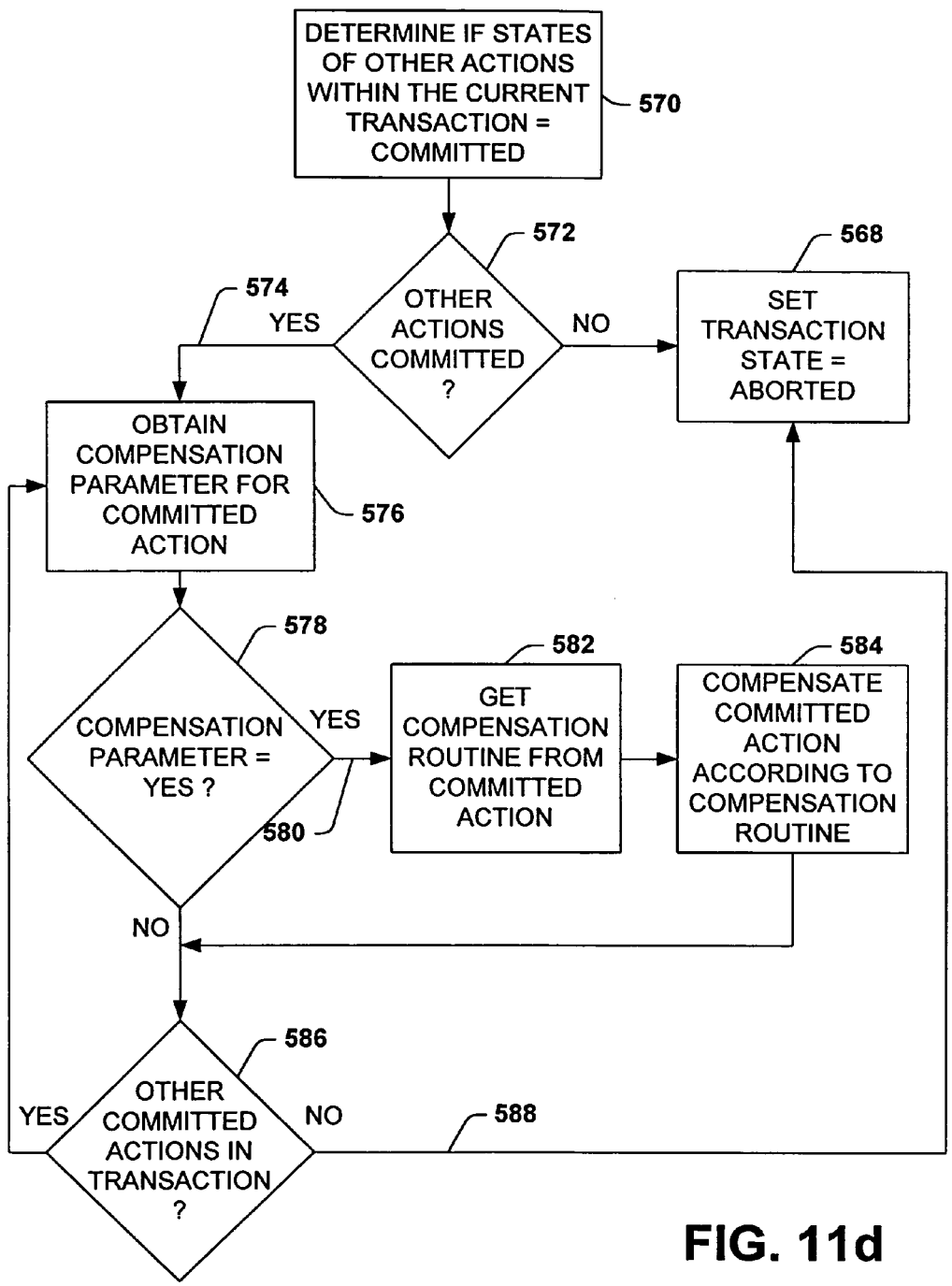
FIG. 11d is a flow chart illustrating a method for selectively compensating data in accordance with the invention.

FIGS. 11*c* and 11*d* illustrate a method for selectively compensating data such as the data 504*a*, based on commission of its associated action 504 (hence the commission of sub transaction 514), and subsequent abortion of the concurrent action 508. In this context, compensation may include sending messages, activating or instantiating objects or actions, rolling back the data by undoing the data manipulation performed by the committed actions, or combinations of these, or even doing nothing. Some examples might include broadcasting messages to notify other programs, objects, etc., that the suspect data may not be reliable, determining which objects, etc., have accessed the subject data after commission by the committed actions and notifying those objects that the data is suspect, or rolling back the data if it is determined that no other entities have accessed the data subsequent to commission by actions within the current transaction.

The compensation can be performed according to a compensation routine, a list of things to do, or a list of objects to activate or instantiate, etc. This selective compensation allows relaxation of isolation within transaction boundaries, resulting in system efficiencies due to increased access to data. Accordingly, aggregate data locking in a given system will be of a shorter duration. Selective compensation further allows reduction in needless compensation where, for example, an action or a transaction does not modify data that will be accessed by other objects.

In FIG. 11*c*, the action C 508 is initialized in step 550, after which the state of the action 508 is checked in step 552. The state of an action may be, for example, waiting, pending, aborted, or committed, or any indication of the status of the action at a given time, and the like. If the action state is not aborted, step 554 transfers execution to step 556, where the action state is tested for commission. If the action has committed, the next action is executed according to the schedule in step 558. Otherwise, execution of action 508 continues in step 560. This mode of execution through steps 552, 554, 556, and 560 continues until the action 508 either commits or aborts. If action 508 aborts, step 554 allows execution to proceed down path 562 to step 564, wherein it is determined whether other actions are within the same transaction as the current aborted action based on the transaction boundaries within the schedule. If not, the transaction state is set to aborted in step 568. If, however, there are other actions in the same transaction, step 570 determines if any have committed.

Referring also to FIG. 11*d*, in step 572, if none of the other actions within the current transaction have committed, no compensation is performed, and the state of the transaction is set to aborted in step 568. In this situation, no compensation is needed because no other actions within the current transactions have modified their associated data. Alternatively, if at least one other action or transaction within the current transaction 500 has committed (and thus has potentially modified the data associated therewith), execution proceeds down path 574 to step 576, wherein the compensation parameter for the committed action is obtained. In the example of FIGS. 11*a* and 11*b*, it was assumed that actions 504 and 506 (and hence sub transactions 514 and 516) had both committed prior to abortion of action 508. Accordingly, the compensation parameter A 528 associated with action 504 is tested in step 578, and found to be "yes", and execution is thereby transferred along path 580 to step 582 where the compensation routine A 530 is obtained.

Thereafter, the data 504*a* associated with action 504 is compensated according to the compensation routine 530 in step 584, whereupon decision step 586 determines whether there are other committed actions within transaction 500 which require selective compensation. In this example, action 506 (and hence sub transaction 516), has committed, and may need compensation based on its associated compensation parameter, and compensation routine (not shown). As such, execution proceeds from step 586 through steps 576, 578, 582, and 584 with respect to the committed action 506, which may or may not be compensated, depending on the compensation parameter and routine, after which step 586 transfers execution down path 588, whereupon step 568 sets the transaction state for the transaction 500 to aborted.

The method illustrated in FIGS. 11*a*-11*d* thus provides a selective compensation method by which committed actions may be compensated based upon associated compensation parameters and routines. In this regard, it will be further appreciated that transaction boundaries can further be used in the invention for selectively compensating a committed transaction. As shown in FIG. 5, the transaction Tx1 240 includes transactions Tx2 212 and Tx3 214 within its transaction boundary. Commission of transaction 240 depends on commission of the action 228, which in turn depends on commission of actions 220 and 224 as well as commission of transactions 212 and 214. Thus, for example, if the transactions 212 and 214 each commit, and the action 224 subsequently aborts, the transactions 212 and 214 can be compensated selectively according to transactional compensation parameters and routines.

Figure 12A:
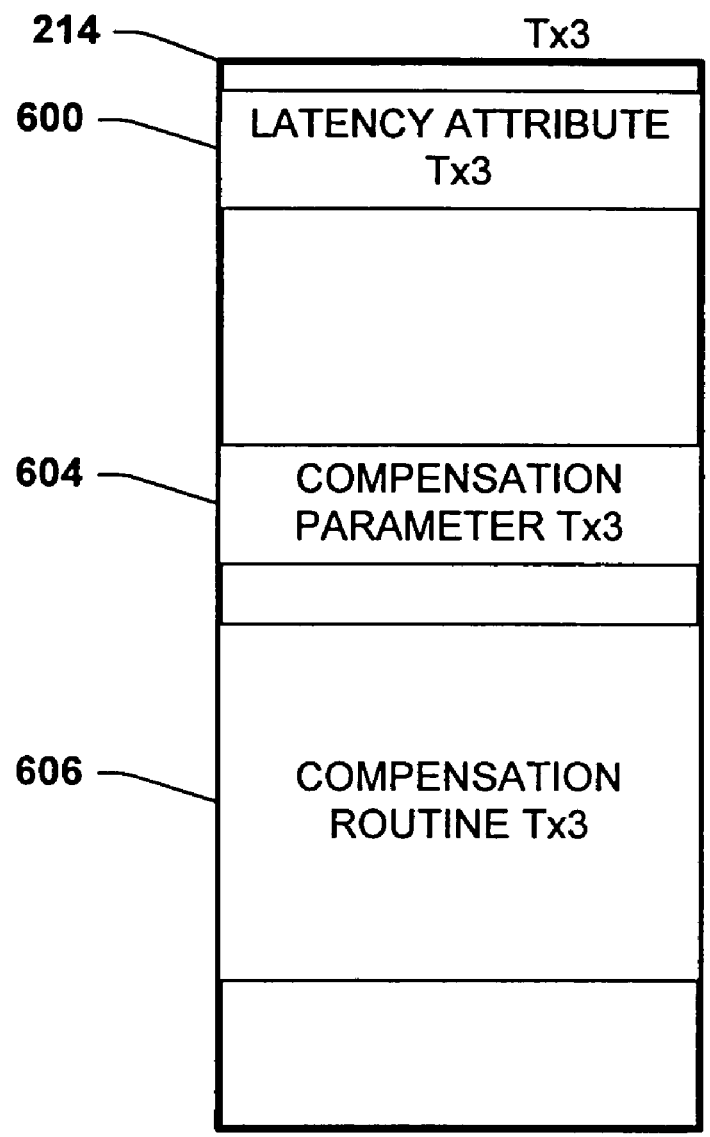
FIG. 12a is a block diagram illustrating a transaction running in a computer system in accordance with the invention.
Figure 12B:
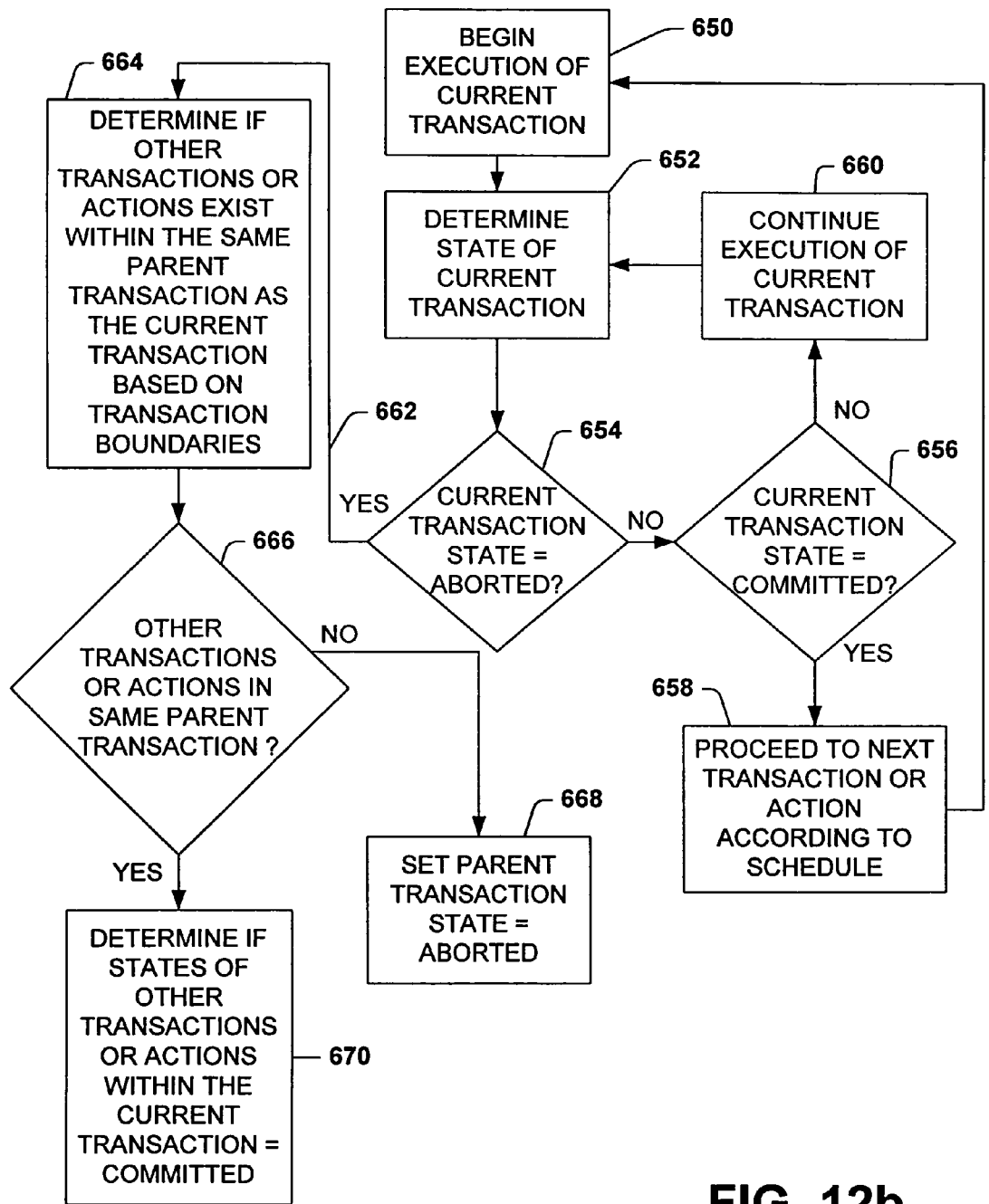
FIG. 12b is a flow chart illustrating a method for selectively compensating data in accordance with the invention.
Figure 12C:
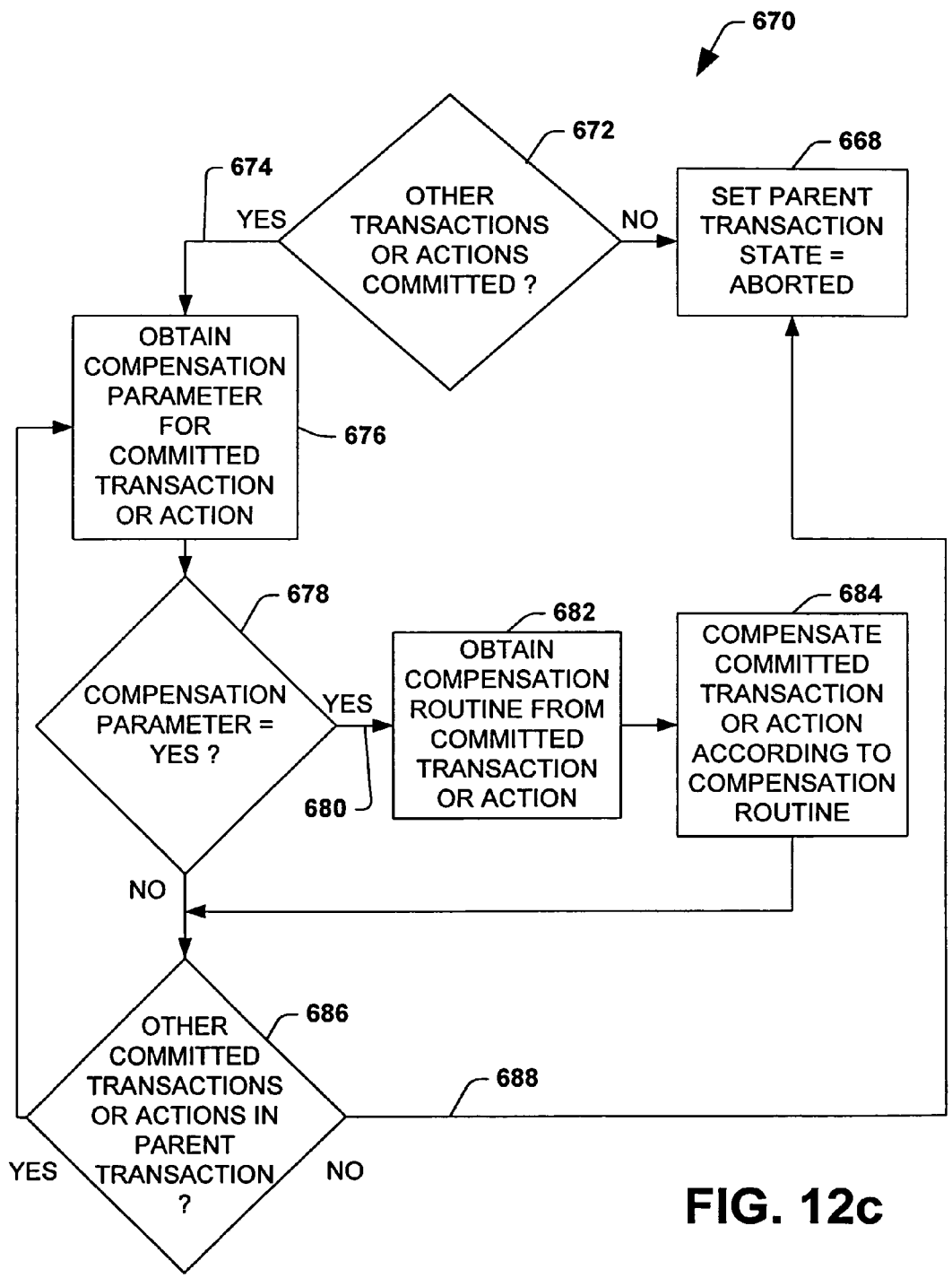
FIG. 12c is a flow chart illustrating a method for selectively compensating data in accordance with the invention.

FIGS. 12*a*, 12*b*, and 12*c* illustrate a method for compensating a transaction according to transaction boundaries, compensation parameters, and compensation routines. FIG. 12*a* shows a transaction Tx3 214 of FIG. 5 which includes a latency attribute 600, a compensation parameter 604, and a compensation routine 606. As discussed hereinabove with respect to FIG. 11*b*, it will be appreciated by those skilled in the art that the latency attribute 600 is included in FIG. 12*a* merely for illustration, and is not required for the selective compensation aspects of the invention. It will further be recognized that the selective dehydration and selective compensation aspects of the invention can be combined in order to facilitate the execution of long running transactions, as discussed more fully hereinafter.

FIGS. 12b and 12c illustrate a method for compensating a committed transaction or action based on failure or abortion of an action or transaction within the same parent transaction. In FIG. 12b, execution of the transaction 214 begins in step 650, after which the state of the transaction 214 is checked in step 652. If the transaction state is not aborted, step 654 transfers execution to step 656, where the transaction state is tested for commission. If the transaction has committed, the next transaction or action is executed according to the schedule in step 658. Otherwise, execution of transaction 214 continues in step 660. This mode of execution through steps 652, 654, 656, and 660 continues until the transaction 214 either commits or aborts. If the transaction 214 aborts, step 654 allows execution to proceed down path 662 to step 664, wherein it is determined whether other transactions or actions are within the same parent transaction as the current aborted transaction 214 based on the transaction boundaries within the schedule. If not, the parent transaction state is set to aborted in step 668. If, however, there are other transactions or actions in the same parent transaction, step 670 determines if any have committed.

Referring also to FIG. 12c, in step 672, if none of the other transactions or actions within the current parent transaction have committed, no compensation is performed, and the state of the parent transaction is set to aborted in step 668. In this situation, no compensation is needed because no other transactions or actions within the current transactions have modified their associated data. Alternatively, if at least one other transaction or action within the parent transaction has committed, execution proceeds down path 674 to step 676 wherein the compensation parameter for the committed transaction or action is obtained. Assuming that the action 224 of FIG. 5 aborts, and that the transaction 214 committed prior to abortion of action 224, the compensation parameter 604 associated with the transaction 214 is tested in step 678, and found to be "yes", and execution is thereby transferred along path 680 to step 682 where the compensation routine 606 is obtained.

Thereafter, the transaction 214 is compensated according to the compensation routine 606 in step 684, whereupon decision step 686 determines whether there are other committed transactions or actions within the parent transaction 240 which require selective compensation. If so, execution proceeds from step 686 through steps 676, 678, 682, and 684 with respect to any other committed transactions or actions within the parent transaction 240, which may or may not be compensated, depending on the compensation parameter and routine, after which step 686 transfers execution down path 688, whereupon step 668 sets the transaction state for the parent transaction 240 to aborted. In this regard, it will be further recognized that both transactions and actions can include latency attributes as discussed above with respect to actions, and including transaction latency attribute 600 as shown in FIG. 12a, and that corresponding dehydration of a schedule may be performed selectively based on comparing the transactional latency attribute 600 with a latency threshold.

Long Running Transactions

Figure 13A:
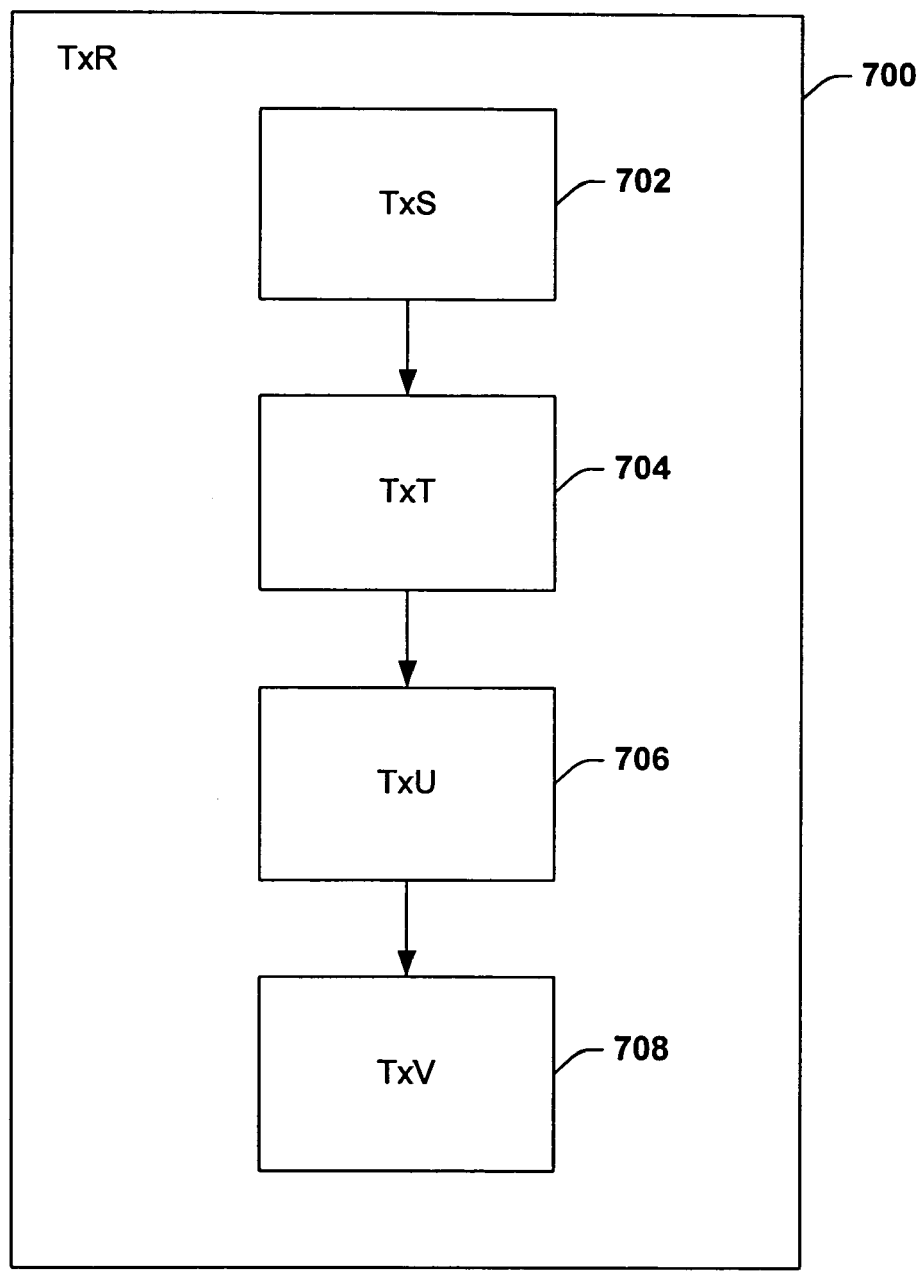
FIG. 13a is a block diagram illustrating a long running transaction running in a computer system in accordance with the invention.
Figure 13B:
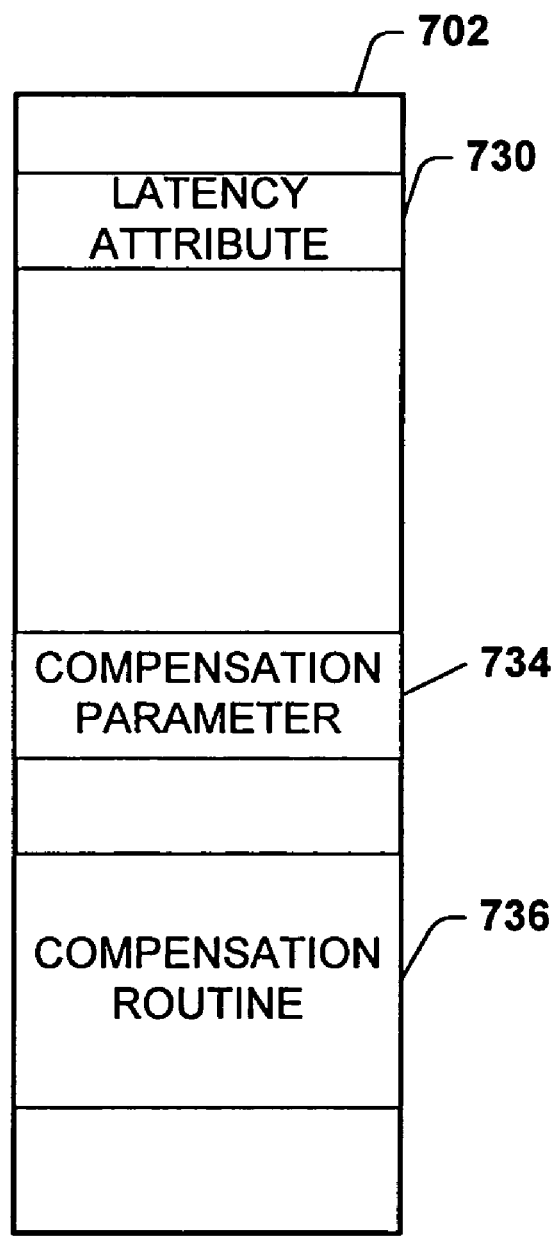
FIG. 13b is a block diagram illustrating a long running transaction running in a computer system in accordance with the invention.

FIG. 13a shows an example of a transaction TxR 700 including a sequence of four individual transactions TxS 702, TxT 704, TxU 706, and TxV 708. Each transaction 702, 704, 706, and 708 within the parent transaction 700, and the transaction 700 itself, requires time to execute, which can be estimated as a latency attribute value. Consequently, according to one aspect of the invention, each such transaction may include a latency attribute value. As an example, the transaction 702 in FIG. 12b includes a latency attribute 730, a compensation parameter 734, and a compensation routine 736. The latency attribute 730 is used in selectively dehydrating a schedule, as discussed above with respect to FIGS. 7a through 7d, 8, 9a, 9b, and 10. The compensation parameter 734 and the compensation routine 736 are used to selectively compensate the transaction 702 according to abortion of an action or transaction within the parent transaction 700 and further according to the transaction boundaries, as discussed with respect to FIGS. 11a through 11d, and 12a through 12c above. It will be appreciated that the value of the latency attribute 730 can also be dynamically adjusted or updated, manually or automatically, based on user or system variables or considerations, as discussed supra in relation to FIG. 10.

Figure 13C:
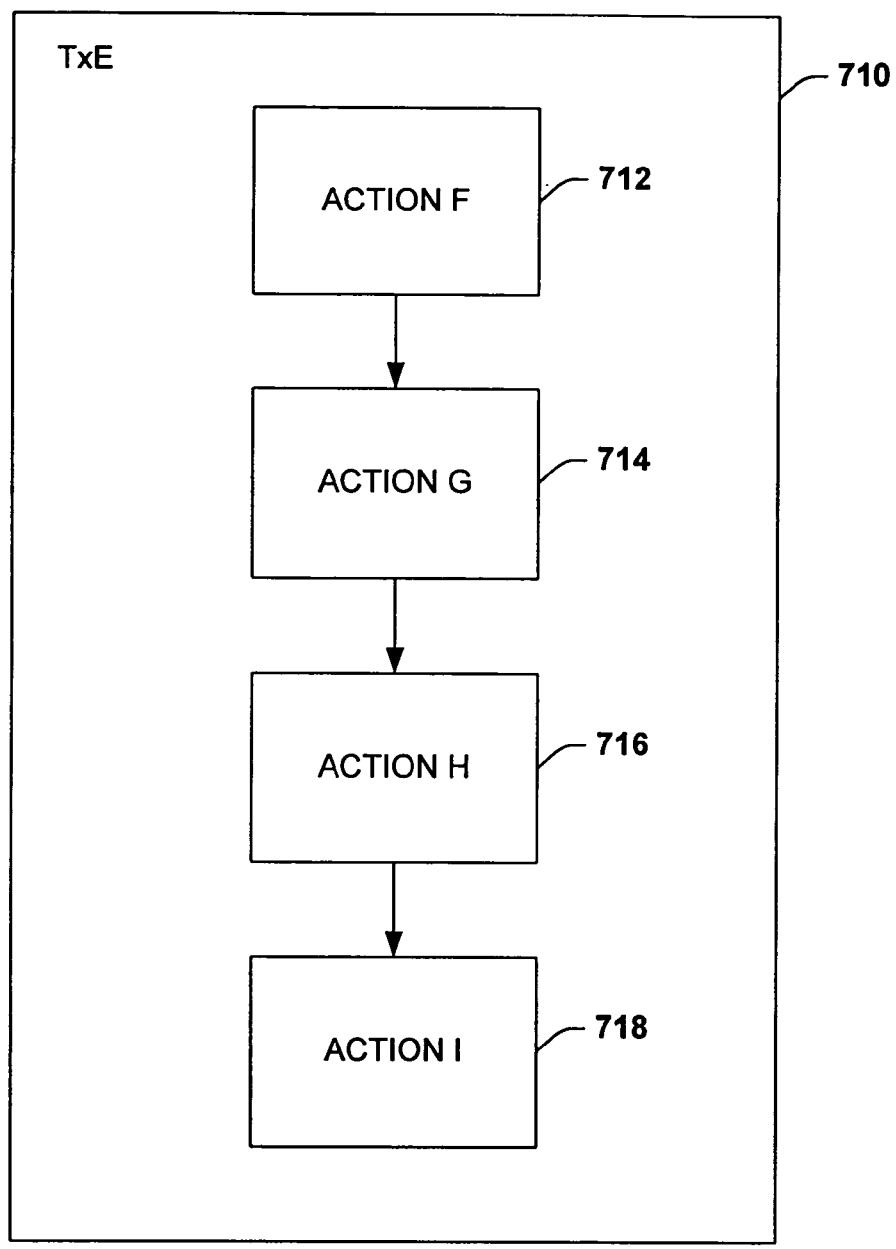
FIG. 13c is a block diagram illustrating a long running transaction running in a computer system in accordance with the invention.

Similarly, a transaction TxE 710 in FIG. 13c, may be defined to include a sequence of four actions F 712, G 714, H 716, and I 718. The transaction 710 may include latency attributes, as well as a compensation parameter and a compensation routine (not shown), for use in selective dehydration and compensation. In addition, the actions 712, 714, 716, and 718 also include latency attributes, as well as a compensation parameter and a compensation routine (not shown), as are shown in FIG. 11b for the action 504. Thus, selective dehydration of a schedule may be implemented according to the latency attributes of any transaction or action in a schedule. Moreover, selective compensation may be accomplished for any action or transaction in a schedule based on transaction boundaries, and abortion and commission of related actions and/or transactions, as discussed supra.

Figure 13D:
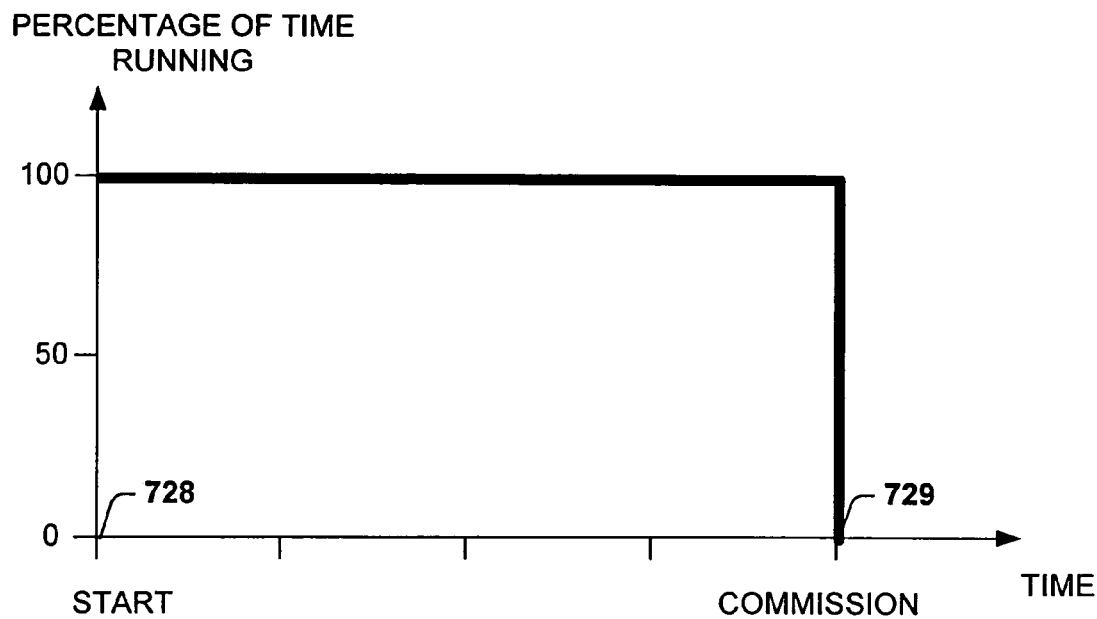
FIG. 13d is a graph illustrating the percentage of time an exemplary schedule is running in a computer system.
Figure 13E:
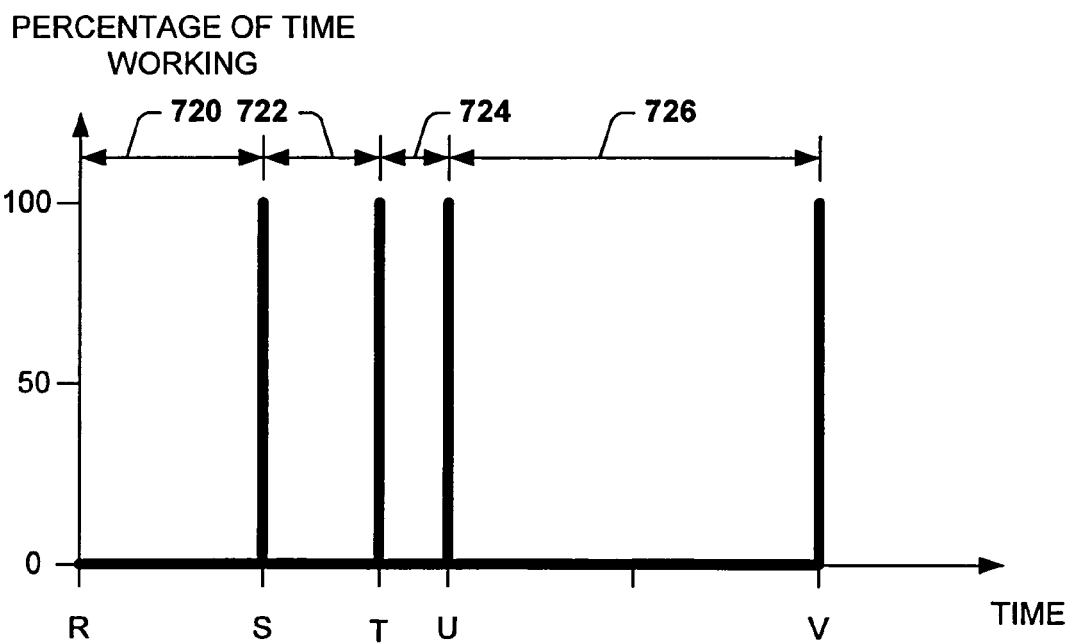
FIG. 13e is a graph illustrating the percentage of time the exemplary schedule of FIG. 13d is working in a computer system.

Long running transactions are executed by selective dehydration and selective compensation methods, including recognition of the transaction boundaries in a workflow schedule. Referring now to FIGS. 13d and 13e, an illustration of the behavior of some long running transactions may be illustrated. With respect to the transaction TxR 700 of FIG. 13a, the graph in FIG. 13d shows the percentage of time the transaction 700 runs in a typical computer system from start 728 to commission 729. Absent selective dehydration methods, the transaction 700 runs continuously from start 728 to commission 729. In other words, regardless of the expected latency of the transactions 702, 704, 706, and 708, these transactions will be resident in the computer system, and otherwise occupying system resources, during the time they may be waiting for an external event, such as a message.

Referring to FIG. 13e, the percentage of time that work is done for transaction 700 is represented versus time. In this figure, it is seen that for long running transactions 702, 704, 706, and/or 708, a significant portion of the run time of transaction 700 is spent doing no real work. This is due to the long latencies 720, 722, 724, and 726, respectively, of the sequence of transactions 702, 704, 706, and 708 in the illustrated example. Thus, although the amount of time it takes to do the work of transaction TxS 702 in FIG. 13e is relatively small, the latency time period 720 is long. Selective dehydration methods allow the run time of long running transactions to approach the actual work time, wherein the run time is the elapsed time between when the transaction starts and when it ends (e.g., commits or aborts).

Figure 13F:
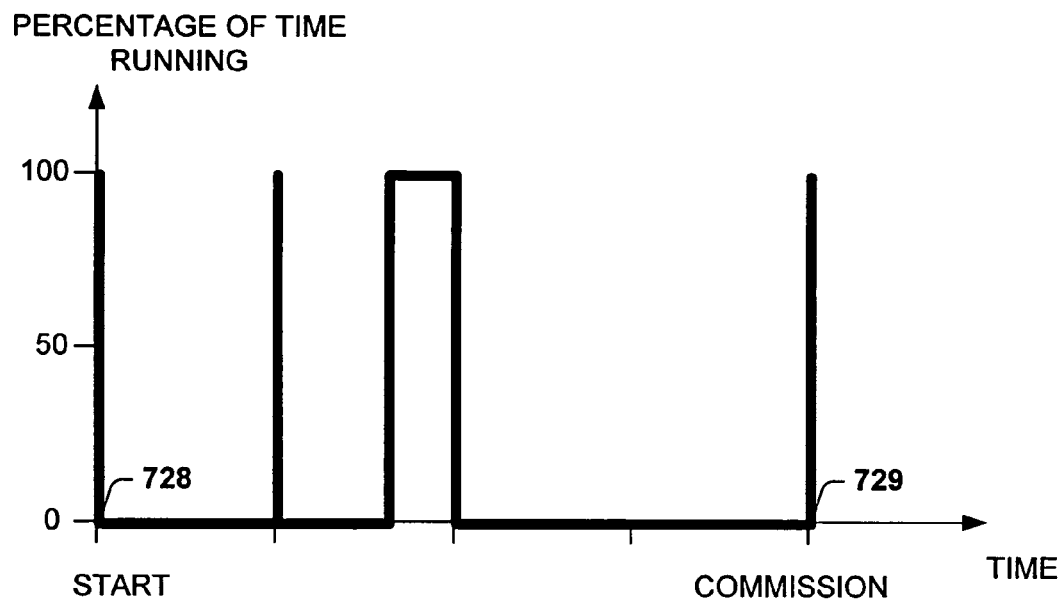
FIG. 13f is a graph illustrating the percentage of time a schedule is running in a computer system in accordance with the invention.
Figure 13G:
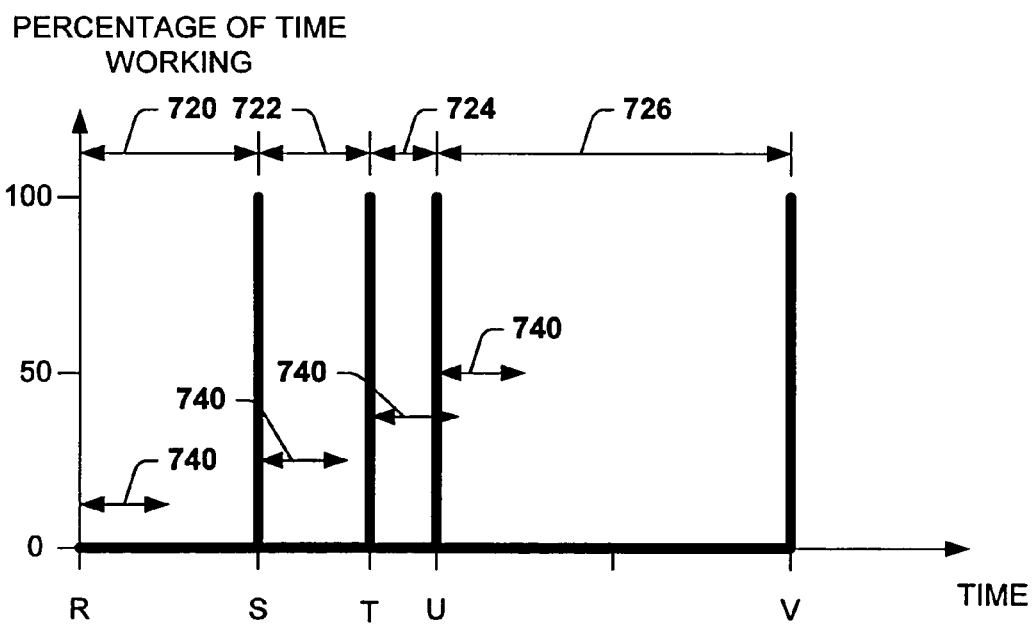
FIG. 13g is a graph illustrating the percentage of time the schedule of FIG. 13f is working in a computer system in accordance with the invention.

Referring also to FIGS. 13f and 13g, using the selective dehydration methods discussed above, it is assumed that for the transaction 700 of FIG. 13a, the latencies 720, 722, 724, and 726, of the transactions 702, 704, 706, and 708 are 400, 250, 150, and 800, respectively, and that the system latency threshold value 740 is 200. It is further assumed that the actions 702, 704, 706, and 708 are not concurrent, so that selective dehydration can occur through the method of FIGS.

7b through 7d. At time R in FIG. 13g, the latency attribute 720 having a value of 400 is greater than the value of the threshold 740, and thus the schedule is dehydrated until the time S, whereat the work is performed for the transaction 702. Thereafter, the latency attribute 722 is compared with the threshold 740 and again the schedule is dehydrated until the time T, where the work for the transaction 704 is done.

The latency attribute value 724 associated with the transaction 706 is less than the threshold 740, thus at time T, no dehydration is done, and the schedule runs until the work for transaction 706 is done at time U, as seen in FIG. 13f. Thereafter, a comparison is made of the latency attribute value 726 and the threshold 740, whereby the schedule is again dehydrated until the time V. At this point, the work for the transaction 708 is completed, and the parent transaction 700 commits. It is thus seen from FIG. 13f, that selective dehydration based on latency attributes, as well as one or more latency thresholds results in a significant reduction of non-working time for the system executing a schedule with long running transactions. During the time when the schedule is dehydrated, the system resources can be used to execute other tasks, thereby improving overall system work throughput and efficiency. Although the system can execute multiple tasks concurrently, the number of tasks so executed is determined by how much of the system resources are being consumed. Dehydration allows for more effective use of system resources.

Selective compensation of actions and transactions according to transaction boundaries, compensation parameters, and compensation routines also results in improved system efficiency, scalability, etc. As discussed above with respect to FIGS. 11a through 11d and 12a through 12c, the provision of selective compensation allows relaxation of isolation within transaction boundaries. Thus, data locks are released once a transaction or action commits. Where no failures or abortions occur during execution of a schedule, therefore, less data locking is required, and the aggregation of the reductions in data locking results in faster availability of data to other schedules, objects, etc. Thus, these outside applications, etc. may run more expeditiously by the provision of selective compensation.

Exemplary Operating Environment

Figure 14:
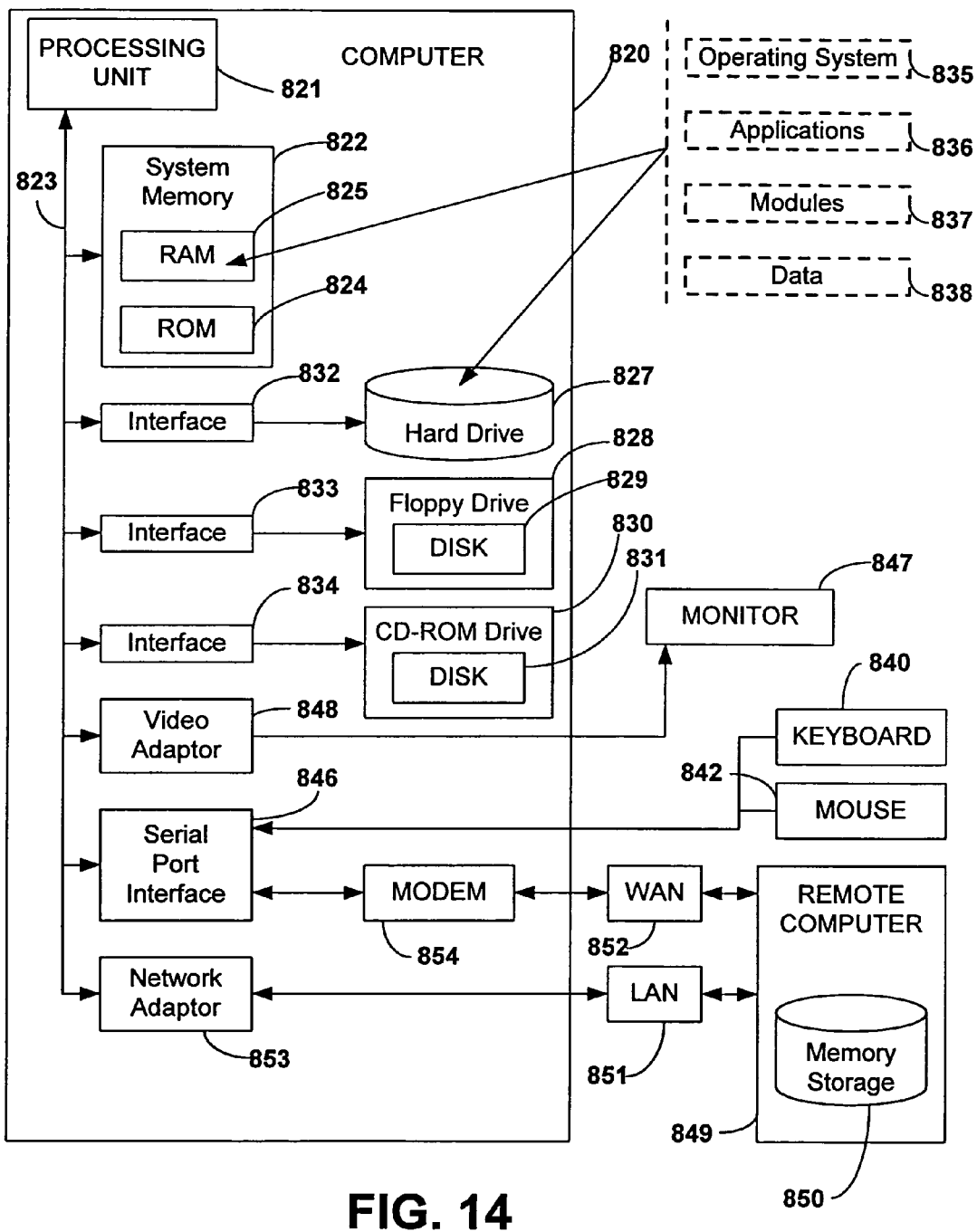
FIG. 14 is a block diagram illustrating an exemplary environment for the invention.

In order to provide a context for the various aspects of the invention, FIG. 14 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary system for implementing the various aspects of the invention includes a conventional server computer 820, including a processing unit 821, a system memory 822, and a system bus 823 that couples various system components including the system memory to the processing unit 821. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 824 and random access memory (RAM) 825. A basic input/output system (BIOS), containing the basic routines that help to transfer information between elements within the server computer 820, such as during start-up, is stored in ROM 824.

The server computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the server computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 825, including an operating system 835, one or more application programs 836, other program modules 837, and program data 838. The operating system 835 in the illustrated computer is the Microsoft Windows NT Server operating system, together with the before mentioned Microsoft Transaction Server.

A user may enter commands and information into the server computer 820 through a keyboard 840 and a pointing device, such as a mouse 842. Other input devices (not shown) may include a microphone, a joystick, a game pad, a satellite dish, a scanner, or the like. These and other input devices are often connected to the processing unit 821 through a serial port interface 846 that is coupled to the system bus, but may be connected by other interfaces, such as a parallel port, a game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The server computer 820 may operate in a networked environment using logical connections to one or more remote computers, such as a remote client computer 849. The remote computer 849 may be a workstation, a server computer, a router, a peer device or other common network node, and typically includes many or all of the elements described relative to the server computer 820, although only a memory storage device 850 is illustrated in FIG. 14. The logical connections depicted in FIG. 14 include a local area network (LAN) 851 and a wide area network (WAN) 852. Such networking environments are commonplace in offices, enterprise-wide computer networks, intranets and the Internet.

When used in a LAN networking environment, the server computer 820 is connected to the local network 851 through a network interface or adapter 853. When used in a WAN networking environment, the server computer 820 typically includes a modem 854, or is connected to a communications server on the LAN, or has other means for establishing communications over the wide area network 852, such as the Internet. The modem 854, which may be internal or external, is connected to the system bus 823 via the serial port interface 846. In a networked environment, program modules depicted relative to the server computer 820, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 820, unless otherwise indicated. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where such data bits are maintained are physical locations that have particular electrical, magnetic, or optical properties corresponding to the data bits.

Although the invention has been shown and described with respect to a certain embodiments, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary embodiments of the invention. In this regard, it will also be recognized that the invention includes a computer-readable medium having computer-executable instructions for performing the steps of the various methods of the invention. In addition, while a particular feature of the invention may have been disclosed with respect to only one of several embodiments, such feature may be combined with one or more other features of the other embodiments as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A method of processing a schedule of a plurality of sub-transactions within a parent transaction at a computer system, the method comprising:

initiating a sub-transaction, from among the plurality of sub-transactions, into system memory of the computer system prior to occurrence of an external event on which the sub-transaction depends, the sub-transaction configured to idle until the external event occurs, the sub-transaction including a latency attribute, the latency attribute representing an estimated wait time indicating how long the sub-transaction is expected to idle waiting for the external event to occur, the sub-transaction represented by transaction boundaries that indicate when the sub-transaction starts and ends within the parent transaction;

accessing a dynamically computed latency threshold, the dynamically computed latency threshold defining a maximum amount of time the computer system is to allow the sub-transaction to remain idle in system memory waiting for an external event to occur, the dynamically computed latency threshold computed in accordance with a latency function based on one or more system performance characteristics of the computer system;

comparing the latency attribute to the latency threshold; determining that the estimated wait time for the sub-transaction exceeds the maximum amount of time the computer system is to allow the sub-transaction to remain idle in system memory waiting for an external event to occur based on the comparison;

in response to the determination, dehydrating the schedule to persist schedule state to non-volatile storage medium, including:
recognizing the transaction boundaries of the sub-transaction;
suspending execution of the schedule;
persisting the schedule state in the non-volatile storage medium based on the transaction boundaries of the sub-transaction; and
selectively de-allocating system memory allocated to the sub-transaction after suspending execution of the schedule to free up de-allocated system memory for use by other workflow actions.

2. The method of claim 1, further comprising establishing a proxy with a naming service to associate the persisted schedule state with the occurrence of the external event.

3. The method of claim 2, further comprising:
detecting the occurrence of the external event subsequent to persisting the schedule state;
reading the persisted schedule state out of the non-volatile storage medium in response to detecting the occurrence of the external event;
restoring the sub-transaction into system memory in response to detecting the occurrence of the external event; and
restoring execution of the sub-transaction based on the external event and the transaction boundaries for the sub-transaction.

4. The method of claim 3, further comprising allocating system memory for execution of the schedule prior to restoring the sub-transaction into system memory.

5. The method of claim 1, wherein the latency attribute is an adjustable latency attribute according to a variable.

6. The method of claim 5, wherein the variable is related to the actual latency for completion of the workflow action.

7. The method of claim 1, further comprising adjusting the latency threshold based on a variable.

8. A computer program product for use at a computer system, the computer program product for implementing a method of processing a schedule of a plurality of sub-transactions within a parent transaction, the computer program product comprising one or more computer storage media having stored thereon computer-executable instructions that, when executed at a processor, cause the computer system to perform the method, including the following:

initiate a sub-transaction, from among the plurality of sub-transactions, into system memory of the computer system prior to occurrence of an external event on which the sub-transaction depends, the sub-transaction configured to idle until the external event occurs, the sub-transaction including a latency attribute, the latency attribute representing an estimated wait time indicating how long the sub-transaction is expected to idle waiting for the external event to occur, the sub-transaction represented by transaction boundaries that indicate when the sub-transaction starts and ends within the parent transaction;

access a dynamically computed latency threshold, the dynamically computed latency threshold defining a maximum amount of time the computer system is to allow the sub-transaction to remain idle in system memory waiting for an external event to occur, the dynamically computed latency threshold computed in accordance with a latency function based on one or more system performance characteristics of the computer system;

compare the latency attribute to the latency threshold;

determine that the estimated wait time for the sub-transaction exceeds the maximum amount of time the computer system is to allow the sub-transaction to remain idle in system memory waiting for an external event to occur based on the comparison;

in response to the determination, dehydrating the schedule to persist schedule state to non-volatile storage medium, including:

recognizing the transaction boundaries of the sub-transaction;

suspending execution of the schedule;

persisting the schedule state in the non-volatile storage medium based on the transaction boundaries of the sub-transaction; and selectively de-allocating system memory allocated to the sub-transaction after suspending execution of the schedule to free up de-allocated system memory for use by other workflow actions.

9. The computer program product of claim 8, further comprising computer-executable instructions that, when executed at a processor, cause the computer system to establish a proxy with a naming service to associate the persisted schedule state with the occurrence of the external event.

10. The computer program product of claim 8, further comprising computer-executable instructions that, when executed at a processor, cause the computer system to:

detect the occurrence of the external event subsequent to persisting the schedule state;

read the persisted schedule state out of the non-volatile storage medium in response to detecting the occurrence of the external event;

restore the sub-transaction into system memory in response to detecting the occurrence of the external event; and restore execution of the sub-transaction based on the external event and the transaction boundaries for the sub-transaction.

11. The computer program product of claim 10, further comprising computer-executable instructions that, when executed at a processor, cause the computer system to allocate system memory for execution of the schedule prior to restoring the sub-transaction into system memory.

12. The computer program product of claim 8, wherein the latency attribute is an adjustable latency attribute according to a variable.

13. The computer program product of claim 12, wherein the variable is related to the actual latency for completion of the workflow action.

14. The computer program product of claim 8, further comprising adjusting the latency threshold based on a variable.

* * * * *